(12) United States Patent
Kim et al.

(10) Patent No.: US 9,820,282 B2
(45) Date of Patent: *Nov. 14, 2017

(54) METHOD FOR INDICATING A DM-RS ANTENNA PORT IN A WIRELESS COMMUNICATION SYSTEM

(71) Applicant: Samsung Electronics Co., Ltd., Gyeonggi-do (KR)

(72) Inventors: Youn Sun Kim, Gyeonggi-do (KR); Jin Kyu Han, Seoul (KR); Sung Tae Kim, Gyeonggi-do (KR); Myung Hoon Yeon, Gyeonggi-do (KR); Cheng Shan, Gyeonggi-do (KR); In Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 168 days.

This patent is subject to a terminal disclaimer.

(21) Appl. No.: 14/846,045

(22) Filed: Sep. 4, 2015

(65) Prior Publication Data

US 2015/0382356 A1  Dec. 31, 2015

Related U.S. Application Data

(63) Continuation of application No. 13/025,748, filed on Feb. 11, 2011, now Pat. No. 9,130,719.

(30) Foreign Application Priority Data

Feb. 11, 2010 (KR) .................... 10-2010-0012806
Mar. 4, 2010 (KR) .................... 10-2010-0019327
Aug. 30, 2010 (KR) .................... 10-2010-0084027

(51) Int. Cl.
*H04W 72/04* (2009.01)
*H04L 5/00* (2006.01)
(Continued)

(52) U.S. Cl.
CPC ....... *H04W 72/0466* (2013.01); *H04L 5/0023* (2013.01); *H04L 5/0053* (2013.01);
(Continued)

(58) Field of Classification Search
CPC ... H04L 5/0023; H04L 5/0026; H04L 5/0053; H04L 5/0094; H04W 72/0466; H04W 72/06; H04W 88/08
(Continued)

(56) References Cited

U.S. PATENT DOCUMENTS

2008/0031191 A1  2/2008  Kashima et al.
2008/0273452 A1  11/2008  Khan et al.
(Continued)

FOREIGN PATENT DOCUMENTS

CN  101605375  12/2009
CN  101631374  1/2010
(Continued)

OTHER PUBLICATIONS

Huawei, "Considerations on DMRS Sequence Design", R1-094342, 3GPP TSG RAN WG1 Meeting #58bis, Oct. 12-16, 2009, 5 pages.
(Continued)

*Primary Examiner* — Stephen J Clawson
(74) *Attorney, Agent, or Firm* — The Farrell Law Firm, P.C.

(57) ABSTRACT

A control information interpretation method of a terminal and a base station in a mobile communication system, and a terminal and a base station concerning the same, respectively, are provided. The control information interpretation method of a terminal includes receiving, by the terminal, control information including transport block information and antenna port related information; identifying whether a codeword 0 is enabled and a codeword 1 is disabled, or both the codeword 0 and the codeword 1 are enabled based on the
(Continued)

transport block information; and interpreting the antenna port related information according to a result of the identification.

32 Claims, 16 Drawing Sheets

(51) Int. Cl.
    *H04W 72/06* (2009.01)
    *H04W 88/08* (2009.01)

(52) U.S. Cl.
    CPC ........... *H04L 5/0094* (2013.01); *H04W 72/06* (2013.01); *H04L 5/0026* (2013.01); *H04W 88/08* (2013.01)

(58) Field of Classification Search
    USPC ........................................................ 370/335
    See application file for complete search history.

(56) References Cited

U.S. PATENT DOCUMENTS

| | | | |
|---|---|---|---|
| 2009/0175371 A1 | 7/2009 | Zhang et al. | |
| 2009/0225888 A1 | 9/2009 | Noh et al. | |
| 2009/0245284 A1* | 10/2009 | Xu | H04L 1/0028 370/474 |
| 2011/0064159 A1 | 3/2011 | Ko et al. | |
| 2012/0307768 A1 | 12/2012 | Xu et al. | |
| 2013/0258914 A1* | 10/2013 | Seo | H04L 1/1896 370/280 |
| 2013/0272157 A1* | 10/2013 | Gao | H04W 52/146 370/252 |
| 2013/0336160 A1* | 12/2013 | Yin | H04L 1/1854 370/254 |
| 2014/0023006 A1* | 1/2014 | Jeong | H04W 72/0446 370/329 |
| 2014/0334419 A1* | 11/2014 | Yang | H04L 1/1861 370/329 |
| 2015/0117272 A1* | 4/2015 | Gao | H04L 1/1861 370/280 |
| 2016/0021655 A1* | 1/2016 | Seo | H04L 1/1829 370/280 |

FOREIGN PATENT DOCUMENTS

| | | |
|---|---|---|
| JP | 2013-519271 | 5/2013 |
| KR | 10-2009-0077710 | 7/2009 |
| KR | 10-2009-0089799 | 8/2009 |
| RU | 2295841 | 3/2007 |
| WO | WO 2011/095062 | 8/2011 |

OTHER PUBLICATIONS

Research in Motion, "Further Discussion on Signaling of DM-RS Port for LTE-A MIMO Transmission", R1-100564, 3GPP TSG RAN WG1 Meeting #59bis, Jan. 18-22, 2010, 6 pages.
Panasonic, "Further Views on Downlink Multi-user MIMO Operation for LTE-Advanced", R1-094510, 3GPP TSG RAN WG1 Meeting #58bis, Nov. 9-13, 2009, 3 pages.
Motorola, Control Signaling for LTE Rel-9 Enhanced DL Transmission, R1-093408, 3GPP TSG RAN WG1 #58, Aug. 24-28, 2009, 7 pages.
Samsung, Discussions on DL Control Signalling for LTE-A MU-MIMO, R1-103021, 3GPP TSG RAN WG1 #61, May 10-14, 2010, 3 pages.
Japanese Office Action dated Mar. 7, 2016 issued in counterpart application No. 2015-111227, 10 pages.
Huawei, "DCI Format Design for Dual-Layer Beamforming", R1-093831, 3GPP TSG RAN WG1 Meeting #58bis, Oct. 12-16, 2009.
Samsung, "Transparency in DL Control Signalling for LTE-A MUMIMO", R1-100108, 3GPP TSG RAN WG1 #59bis, Jan. 18-22, 2009.
Japanese Office Action dated Oct. 21, 2014 issued in counterpart application No. 2012-552812.
Russian Office Action dated Feb. 2, 2015 issued in counterpart application No. 2012121693/07.
Japanese Office Action dated May 1, 2015 issued in counterpart application No. 2012-552812.
Motorola, "Control Signaling for Enhanced DL Transmission for LTE", R1-091339, 3GPP TSG RAN WG1 #56bis, Mar. 23-27, 2009, 10 pages.
Huawei, "Downlink Control Signaling for Dual-Layer Beamforming", R1-093027, 3GPP TSG RAN WG1 Meeting #58, Aug. 24-28, 2009, 4 pages.
Samsung, "Further Discussion on Enhanced DL Beam-forming", R1-092267, 3GPP TSG RAN WG1 Meeting #57, May 4-8, 2009, 10 pages.
Alcatel-Lucent Shanghai Bell, Alcatel-Lucent, "DCI Format Design for LTE-A PUSCH Transmission", R1-100433, 3GPP TSG RAN WG1 Meeting #59bis, Jan. 18-22, 2010, 7 pages.
ZTE, "Investigation for DMRS of Rank 5-8", R1-100534, 3GPP TSG RAN WG1 Meeting #59bis, Jan. 18-22, 2010, 6 pages.
Huawei, "Control Signalling for MU-MIMO", R1-100249, 3GPP TSG RAN WG1#59bis, Jan. 18-22, 2010, 6 pages.
European Search Report dated Jun. 28, 2016 issued in counterpart application No. 11154158.7-1874, 8 pages.
Korean Office Action dated Aug. 2, 2016 issued in counterpart application No. 10-2010-0084027, 8 pages.

* cited by examiner

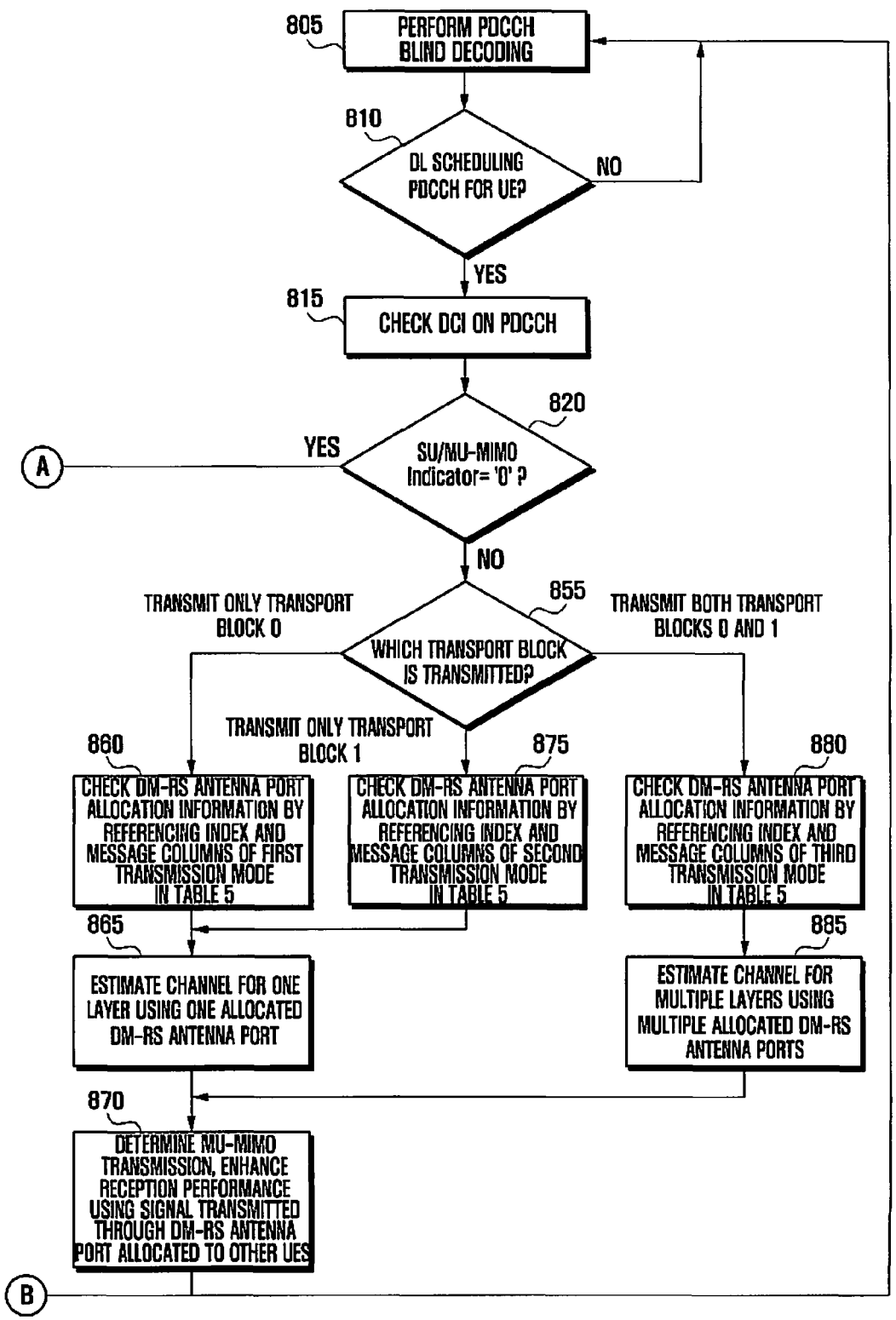

METHOD FOR INDICATING A DM-RS ANTENNA PORT IN A WIRELESS COMMUNICATION SYSTEM

PRIORITY

This continuation application claims priority under 35 U.S.C. §120 to U.S. patent application Ser. No. 13/025,748 (now in condition for allowance), filed on Feb. 11, 2011 in the United States Patent and Trademark Office, which claims priority under 35 U.S.C. §119(a) to Korean Patent Application Nos. 10-2010-0012806, 10-2010-0079327, and 10-2010-0084027, which were filed in the Korean Intellectual Property Office on Feb. 11, 2010, Mar. 4, 2010, and Aug. 30, 2010, respectively, the entire disclosures of which are incorporated herein by reference.

BACKGROUND OF THE INVENTION

1. Field of the Invention

The present invention relates generally to wireless communications and, in particular, to a method for transmitting a Channel State Information Reference Signal (CSI-RS) for a User Equipment (UE) to measure channel quality in a wireless communication system based on a multi-carrier multiple access scheme such as Orthogonal Frequency Division Multiple Access (OFDMA).

2. Description of the Related Art

Mobile communication systems, which were originally designed for providing voice-based services, have developed to wireless packet data communication systems that provide high speed, high quality wireless data and multimedia services. Technology standardization organizations such as $3^{rd}$ Generation Project Partnership (3GPP), 3GPP2, and Institute of Electrical and Electronics Engineers (IEEE) are working to improve the beyond-3G communication technologies based on various multi-carrier multiple access schemes. For example, 3GPP Long Term Evolution (LTE), the 3GPP2 Ultra Mobile Broadband (UMB), and the IEEE 802.16m are mobile communication technology standards based on the multi-carrier multiple access schemes for supporting high speed high quality wireless packet data transmission services.

Evolved 3G communication systems, such as LTE, UMB, and 802.16m, based on the multi-carrier multiple access scheme various techniques including Multiple Input Multiple Output (MIMO) beamforming, Adaptive Modulation and Coding (AMC), and channel sensitive scheduling for improving transmission efficiency. These techniques improve system throughput by concentrating the transmit power of multiple antenna or adjusting the transmit data amount and transmitting data first to the user having good channel quality. Because these techniques operate based on channel quality information between a base station (i.e., evolved Node B (eNB)) and a mobile station (i.e., User Equipment (UE)), the eNB or the UE measures the channel quality, and a CSI-RS is used for this purpose.

Time, frequency, and power resources are limited in a mobile communication system. Accordingly, as resources allocated for a reference signal increase, a traffic channel resource decreases, thereby reducing the amount of data that can be transmitted. In such a case, channel measurement and estimation performance is improved, but the system throughput decreases.

Accordingly, there is a for efficient resource allocation for transmission of the reference signals and traffic channels in order to secure optimum performance in view of system throughput.

In the evolved $3^{rd}$ generation mobile communication system standards, reference signals are categorized into two categories: Common Reference Signal (CRS) and Dedicated Reference Signal (DRS). A CRS is often referred to as a cell-specific RS or a Common RS in a 3GPP LTE system, and is received by all the UEs within the cell of an eNB. In order to support channel estimation and measurement for transmission with multiple transmit antennas, several reference signal patterns are defined for distinction between antenna ports.

A DRS is an additional reference signal that is transmitted separately from the CRS and is transmitted to a specific UE selected by the eNB. The DRS is also referred to as a UE-specific RS in the 3GPP LTE system and is used for supporting the data traffic channel transmission with non-codebook based precoding.

In LTE-Advanced (LTE-A), which evolved from LTE, a DeModulation Reference Signal (DM-RS) is used for supporting channel estimation of up to 8 layers, in addition to the CRS and DRS. Similar to the DRS, the DM-RS is transmitted in a UE-specific manner, apart from the transmission of CRS.

In the LTE-A system, the downlink signal is transmitted with OFDMA transmission scheme utilizing both frequency and time domains. The downlink frequency band is divided into a plurality of Resource Blocks (RBs), each including 12 subcarriers in a frequency domain, and subframes of which, each including 14 OFDM symbols in a time domain. The eNB performs transmission in a unit of radio resources composed of one or more RBs in a frequency domain and in a subframe in time domain. The resource unit defined by one subcarrier for one OFDM symbol duration is referred to as a Resource Element (RE).

In a Single User-Multiple Input Multiple Output (SU-MIMO) mode or a Multi User-Multiple Input Multiple Output (MU-MIMO) mode, transmission can be performed using multiple layers. For multi-layer transmission, the DM-RS resource is allocated for each layer. The DM-RS resource allocated for channel estimation of one layer is referred to as a DM-RS port in the LTE-A system. Herein, the term DM-RS resource is used interchangeably with DM-RS port.

FIG. 1 illustrates DM-RS patterns designed for use in an LTE-A system.

Referring to FIG. 1, reference number 100 denotes a rank 2 DM-RS pattern in which an eNB transmits DM-RSs for two layers. When transmitting two DM-RSs in the rank 2 DM-RS pattern as illustrated in FIG. 1, the DM-RSs are orthogonally spread with spread factor 2 at positions 101 and 102 and then transmitted in a Code Division Multiplexing (CDM) group. In a similar manner, the orthogonally spread DM-RSs are transmitted at positions 103 and 104. In FIG. 1, the consecutive blue-colored REs carry the DM-RSs. Accordingly, the DM-RSs of two DM-RS antenna ports are Code-Division Multiplexed (CDMed) on the same frequency and time resource.

In FIG. 1, reference number 110 denotes a rank 4 DM-RS pattern in which the eNB transmits DM-RSs for four layers. The rank 4 DM-RS pattern is also spread the DM-RSs with the same spread factor 2 as the rank 2 DM-RS pattern 100, except that additional REs are used for the four DM-RS antenna ports. Accordingly, the rank 4 DM-RS pattern 110 has twice as many REs for DM-RSs as compared to the rank 2 DM-RS pattern 100.

In FIG. 1, reference number 120 denotes a rank 8 DM-RS pattern in which the eNB transmits DM-RSs for eight layers. The rank 8 DM-RS pattern 120 uses the same number of REs as the rank 4 DM-RS pattern 110 for DM-RS transmission. In order to transmit the DM-RSs for eight DM-RS antenna ports with the number of REs same as the rank 4 DM-RS pattern 110, the rank 8 DM-RS pattern 120 orthogonally spreads the DM-RSs with a spread factor 4 at the positions 105, 106, 107, and 108.

In an LTE-A system, the rank of the signal transmitted by the eNB varies depending on a state of the downlink channel. Because the rank of the transmit signal of the eNB varies, the DM-RS pattern also changes depending on the signal rank. That is, the eNB can use the rank 8 DM-RS pattern 120 for the layers having a large number of channels and the rank 2 DM-RS pattern 100 for the layers having a small number of channels. As described above, because the DM-RS pattern is time-varying and the DM-RS port allocated to a UE may also vary, the eNB should notify the corresponding UE of the DM-RS pattern and the DM-RS antenna port to modulate the correct downlink traffic channel.

When the three DM-RS patterns of FIG. 1 are available and a maximum of 8 DM-RS antenna ports are supported, the eNB can notify the UE of DM-RS information using two bits indicating the DM-RS pattern and eight bits indicating the DM-RS antenna port in the form of bit map. That is, in order to notify a UE of the DM-RS resource, a total of 10 bits are used. Assuming that a rank 2 DM-RS pattern, a rank 4 DM-RS pattern, and a rank 8 DM-RS pattern are indicated by 00, 01, and 02, respectively, the eNB can notify the UE that DM-RS antenna ports 1 and 2 are allocated in the rank 4 DM-RS pattern by transmitting the information of 01 and 01100000.

However, using 10 bits of information to notify the UE of the allocated DM-RS resource is relatively redundant, thereby reducing downlink system throughput.

Another problem of the above-described method is that the UE cannot acquire the DM-RS antenna port information for other UEs. That is, the UE can only acquire its own DM-RS antenna port information.

In a wireless communication system supporting MU-MIMO downlink transmission such as an LTE-A system, if transmissions for other UEs on a same time/frequency resource allocated to a specific UE are known, it is possible to implement efficient reception algorithm for the UE. For a receiver operating based on a Minimum Mean Square Error (MMSE), the received determines strength of interference for achieving optimum performance. Further, in order to measure the strength of the interference accurately, the receiver first determines whether or not there is interference. However, the above-described DM-RS resource notification does not provide the UE with any interference-related information.

Accordingly, there is a need to provide a UE with information on whether other UE transmissions are causing interference, in addition to efficient DM-RS resource notification.

In an LTE-A system, an eNB can assign up to 8 DM-RS antenna ports to a single UE. Each antenna port allows channel estimation for one of multiple layers of MIMO transmission of the eNB. The eNB notifies the UE of the allocated DM-RS antenna port using Physical Downlink Control Channel (PDCCH) designed to transmit control information. Because the DM-RS antenna port allocation is required for each layer when the eNB performs MIMO transmission, it is closely related to the MIMO transmission scheme of the eNB. That is, for MIMO transmission for three layers, the eNB transmits the control information on the three DM-RS antenna ports to one or more UEs.

SUMMARY OF THE INVENTION

The present invention has been made in view of at least the above-described problems, and provides a method for transmitting, to a UE, DM-RS resource information for receiving downlink traffic in an LTE-A system that informs the UE of DM-RS resources allocated for other UEs in a same frequency/time resource.

In accordance with an aspect of the present invention, a control information interpretation method of a terminal in a mobile communication system is provided. The method includes receiving, by the terminal, control information including transport block information and antenna port related information; identifying whether a codeword 0 is enabled and a codeword 1 is disabled, or both the codeword 0 and the codeword 1 are enabled based on the transport block information; and interpreting the antenna port related information according to a result of the identification.

In accordance with another aspect of the present invention, a control information transmission method of a base station in a mobile communication system is provided. The method includes determining, by the base station, whether a codeword 0 is enabled and a codeword 1 is disabled, or both the codeword 0 and the codeword 1 are enabled; selecting antenna port related information according to a result of the determination; generating control information including transport block information indicating whether the codeword 0 is enabled and the codeword 1 is disabled, or both the codeword 0 and the codeword 1 are enabled and the antenna port related information; and transmitting the control information to the terminal.

In accordance with another aspect of the present invention, a terminal for interpreting control information received from a base station in a mobile communication system is provided. The terminal includes a radio communication unit for receiving control information including transport block information and antenna port related information; and a controller for identifying whether a codeword 0 is enabled and a codeword 1 is disabled, or both codeword 0 and codeword 1 are enabled based on the transport block information, for interpreting the antenna port related information according to a result of the identification.

In accordance with another aspect of the present invention, a base station for transmitting control information in a mobile communication system is provided. The base station includes a controller for determining whether a codeword 0 is enabled and a codeword 1 is disabled, or both the codeword 0 and the codeword 1 are enabled, for selecting antenna port related information according to a result of the determination, for generating control information including transport block information indicating whether the codeword 0 is enabled and the codeword 1 is disabled, or both the codeword 0 and the codeword 1 are enabled and the antenna port related information, and a radio communication unit for transmitting the control information to the terminal.

BRIEF DESCRIPTION OF THE DRAWINGS

The above and other aspects, features, and advantages of certain embodiments of the present invention will be more apparent from the following detailed description in conjunction with the accompanying drawings, in which:

FIGS. 8A and 8B are a flowchart illustrating a method for a UE to determine DM-RS antenna ports allocated to the UE and other UEs scheduled in a same frequency/time resource based on a DM-RS antenna port allocation index and an SU/MU-MIMO indicator transmitted by an eNB according to an embodiment of the present invention;

DETAILED DESCRIPTION OF EMBODIMENTS OF THE INVENTION

Figure 1:
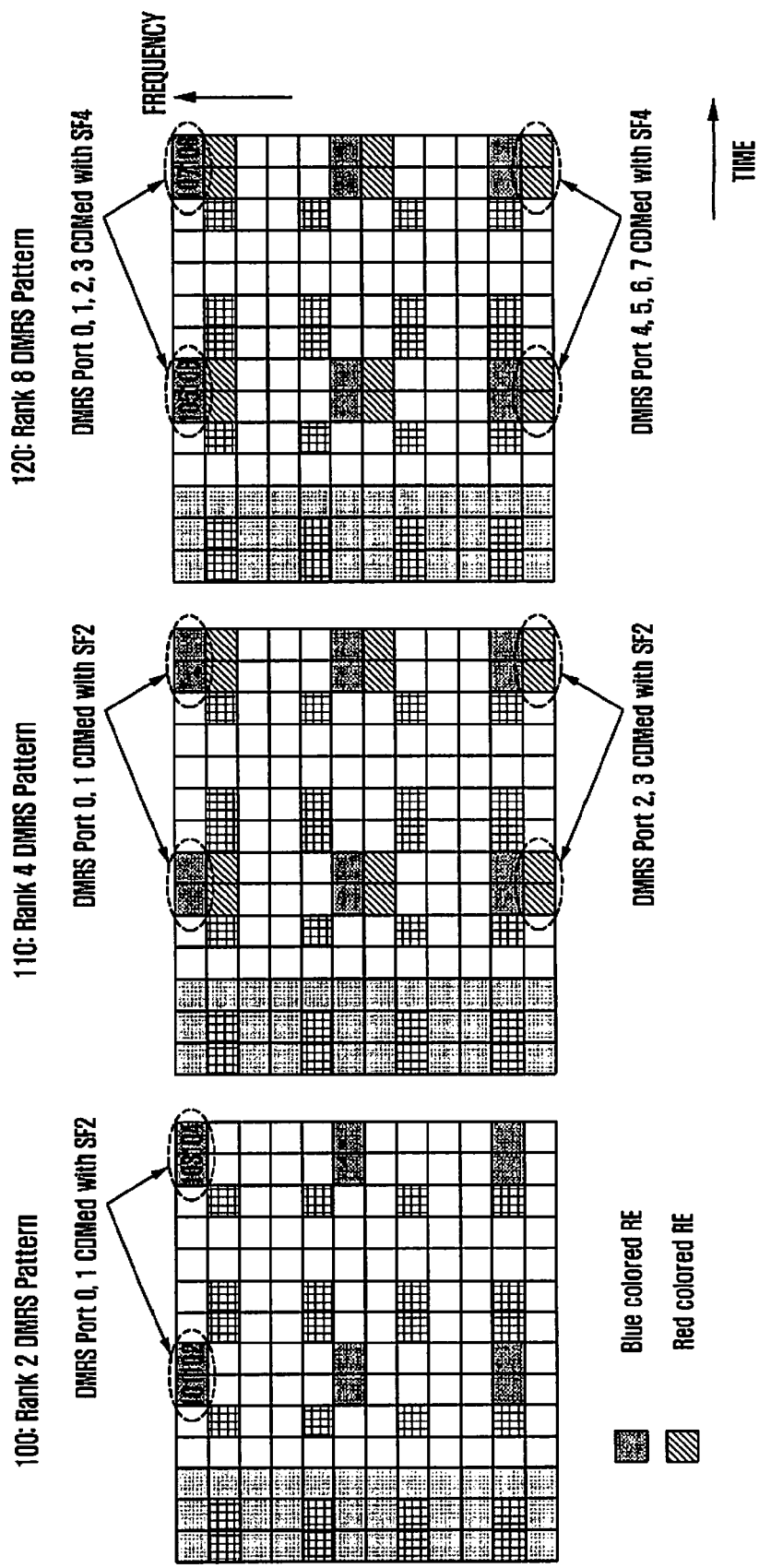
FIG. 1 is a diagram illustrating conventional DM-RS patterns designed for use in an LTE-A system.

Various embodiments of the present invention are described with reference to the accompanying drawings in detail. The same reference numbers are used throughout the drawings to refer to the same or like parts. Additionally, detailed descriptions of well-known functions and structures incorporated herein may be omitted to avoid obscuring the subject matter of the present invention.

In an LTE-A system, there are two MIMO cases: (1) an SU-MIMO case in which an eNB allocates transmission layers to a single UE; and (2) an MU-MIMO case in which the eNB allocates the transmission layers to two or more UEs. In the SU-MIMO case, a UE can be allocated 1, 2, 3, 4, 5, 6, 7, or 8 transmission layers. That is, the eNB can allocate up to 8 DM-RS antenna ports according to its determination in the SU-MIMO case.

However, the MU-MIMO case is implemented under the restrictions in consideration of implementation complexity.

1. The MU-MIMO can support transmission to up to four UEs on the same frequency/time resource
2. The MU-MIMO can allocate up to 2 layers to a single UE.
3. The MU-MIMO can support transmission for up to 4 layers on the same frequency/time resource. That is, it is possible for allocating one layer for each of four UEs or two layers for each of two UEs but two layers for each of three UEs.

The SU-MIMO and MU-MIMO can change per frequency bandwidth in units of a subframe (1 msec) according to the determination of the eNB. In the LTE-A system, the restriction of up to 4 layers for eNB transmission can be substituted for 4 composite ranks of MU-MIMO.

One of the restrictions relevant to MIMO transmission shared by the LTE-A and LTE systems is that only one transport block can be transmitted on a layer. Here, the transport block in a unit of the transmitted traffic information is transferred from the upper layer of the LTE or LTE-A system to the physical layer so as to be encoded and modulated. In the LTE or LTE-A system, the eNB can transmit up to two transport blocks to one UE using a same frequency/time resource. When transmitting one transport block, the transport block is transmitted to the corresponding UE on a single layer; however, at least two layers are used to transmit two transport blocks.

Considering restrictive conditions for allocating layers in MU-MIMO and SU-MIMO cases and the fact that the two transport blocks are transmitted on two or more layers, in accordance with an embodiment of the present invention, a method is proposed for minimizing control information used to notify a UE of DM-RS antenna ports allocated to the UE. Also, in accordance with another embodiment of the present invention, a method is proposed for an eNB to notify a UE as to whether a signal received by the UE is a part of the MU-MIMO signal or the SU-MIMO signal dedicated to the UE. When the received signal is a part of the MU-MIMO signal, information on DM-RS antenna ports allocated to other UEs are notified such that the UE can measure and cancel interference components.

In accordance with an embodiment of the present invention, DM-RS antenna port notification is performed using information on a DM-RS antenna port and transport blocks that are already used in the LTE and LTE-A systems. As described above, two transport blocks can always be transmitted on two or more layers. Also, one transport block is always transmitted on a single layer. When the eNB transmits the traffic channel, i.e. a PDSCH, in the LTE and LTE-A system, the PDCCH is configured to carry control information notifying a UE as to whether a number of transport blocks is 1 or 2. In accordance with an embodiment of the present invention, a UE is notified of DM-RS antenna ports using minimum control information by using transport block information and DM-RS antenna port allocation information.

Figure 2:
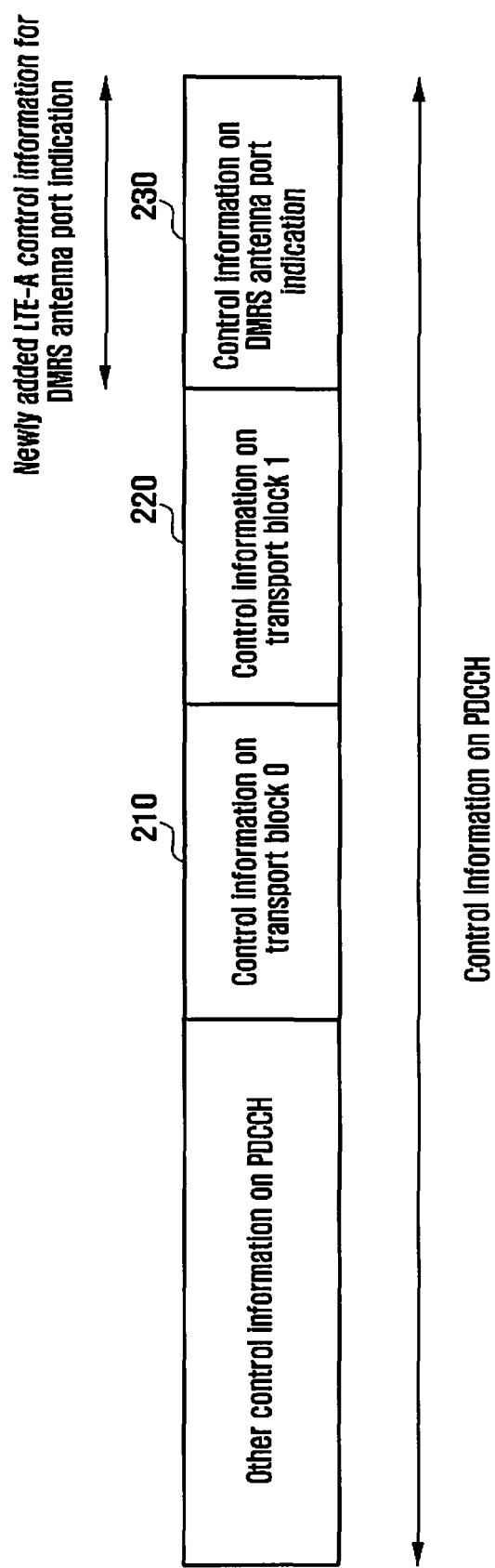
FIG. 2 is a diagram illustrating control information carried on a PDCCH for use in an LTE-A system according to an embodiment of the present invention.

FIG. 2 is a diagram illustrating control information carried on a PDCCH for use in an LTE-A system according to an embodiment of the present invention.

Referring to FIG. 2, reference number 230 denotes DM-RS antenna port indication information (hereinafter, interchangeably referred to as a DM-RS resource indicator), which is a part of the control information transmitted on the PDCCH. When the PDCCH is received, the UE analyzes the DM-RS antenna port indication control information 230 by referencing the transport block 0 control information 210 and the transport block 1 control information 220. The transport block 0 control information 210 includes information on whether the corresponding transport block is transmitted and, if it is, the size of the transport block. The transport block 1 control information 220 includes information on whether the corresponding transport block is transmitted and, if it is, the size of the transport block. An eNB can notify the UE of the transport blocks to be transmitted, i.e., one or both of the transport block 0 and transport block 1. The control information on transport blocks 0 and 1, as denoted by reference number 210 and 220 of FIG. 2, which has been used in the legacy LTE system, is also used in the LTE-A system. In accordance with an embodiment of the present invention, a method is proposed for indicating DM-RS antenna port with a minimum number of bits by using the transport block control information 210 and 220 and the DM-RS resource indication information 230.

Table 1, below, shows indices indicating DM-RS antenna port allocation and messages describing the meanings of the indices according to an embodiment of the present invention.

The DM-RS antenna port allocation for MIMO transmission is notified as follows:

<System Characteristics 1>
1. SU-MIMO transmission for 1-8 layers
2. MU-MIMO transmission for up to 2 layers allocated to a UE
3. MU-MIMO transmission to up to 4 UEs
4. MU-MIMO transmission for up to 4 layers (maximum composite rank of MU-MIMO is 4).

When an eNB notifies a scheduled UE of an allocated DM-RS antenna port for use in an MU-MIMO transmission, the eNB also provides information on DM-RS antenna ports allocated to other UEs that may transmit signals causing interference on a same time/frequency resource.

According to an embodiment of the present invention, an eNB determines different DM-RS resource allocation schemes with DM-RS resource indicators according to the transport block(s) to be used, as shown in Table 1.

Accordingly, the UE interprets the index transmitted by the UE depending on the transport block to be transmitted, i.e., transport block 0, transport block 1, or transport blocks 0 and 1. For example, if the eNB transmits an index value of 3 to a UE, the meaning of the index value can be interpreted by the UE differently depending on the settings of the transport block control information 210 and 220. Assuming that the transport block control information 210 and 220 are set such that only the transport block 1 is transmitted, the UE recognizes that the DM-RS antenna port 3 in the rank 4 DM-RS pattern 110 of FIG. 1 is allocated to the UE and the DM-RS antenna ports 0, 1, and 2 are allocated to other UEs for MU-MIMO transmission. That is, the UE can acquire the information on the DM-RS antenna ports allocated to other UEs that are potentially causing interference, as well as the information on the DM-RS antenna port allocated to the UE itself, thereby efficiently mitigating interference.

In order to allocate DM-RS antenna ports based on Table 1, 4 bits are used for identifying up to 10 indices of each transport block transmission, as shown in Table 1. When using Table 1, the DM-RS antenna port allocation and interference-related information of the 4 bits is carried in the information field 230 as illustrated in FIG. 2.

TABLE 1

DM-RS antenna port allocation and interference notification in SU-MIMO transmission for up to 8 layers per UE and MU-MIMO transmission for up to 2 layers per UE with maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 0 | Rank 2 pattern, DMRS port 0 with SC0 allocated, DMRS port 1 with SC0 and DMRS port 0, 1 with SC1 not used | 0 | Rank 2 pattern, DMRS port 1 with SC0 allocated, DMRS port 0 with SC0 used by other UEs, DMRS port 0, 1 with SC1 not used | 0 | Rank 2 pattern, DMRS port 0, 1 with SC0 allocated, DMRS port 0, 1 with SC1 not used |
| 1 | Rank 2 pattern, DMRS port 0 with SC0 allocated, DMRS port 1 with SC0 used by other UEs, DMRS port 0, 1 with SC1 not used | 1 | Rank 2 pattern, DMRS port 0 with SC1 allocated, DMRS port 0, 1 with SC0 used by other UEs, DMRS port 1 with SC1 not used | 1 | Rank 2 pattern, DMRS port 0, 1 with SC0 allocated, DMRS port 0 with SC1 used by other UEs, DMRS port 1 with SC1 not used |
| 2 | Rank 2 pattern, DMRS port 0 with SC0 allocated, DMRS port 1 with SC0 and DMRS port 0 with SC1 used by other UEs, DMRS port 1 with SC1 not used | 2 | Rank 2 pattern, DMRS port 0 with SC1 allocated, DMRS port 0, 1 with SC0 and DMRS port 1 with SC1 used by other UEs | 2 | Rank 4 pattern, DMRS port 0, 1, 2 with SC0 allocated, DMRS port 3 with SC0 not used, DMRS with SC1 not used |
| 3 | Rank 2 pattern, DMRS port 1 with SC0 allocated, DMRS port 0 with SC0 and DMRS port 0 with SC1 used by other UEs, DMRS port 1 with SC1 not used | 3 | Rank 2 pattern, DMRS port 1 with SC1 allocated, DMRS port 0, 1 with SC0 and DMRS port 0 with SC1 used by other UEs | 3 | Rank 2 pattern, DMRS port 0, 1 with SC0 allocated, DMRS port 0, 1 with SC1 used by other UEs |
| 4 | Rank 2 pattern, DMRS port 0 with SC0 allocated, DMRS port 1 with SC0 and DMRS port 0, 1 with SC1 used by other UEs | 4 | reserved | 4 | Rank 2 pattern, DMRS port 0, 1 with SC1 allocated, DMRS port 0, 1 with SC0 used by other UEs |
| 5 | Rank 2 pattern, DMRS port 1 with SC0 allocated, | 5 | reserved | 5 | Rank 4 pattern, DMRS port 0, 1, 2, 3 with SC0 allocated, |

TABLE 1-continued

DM-RS antenna port allocation and interference notification in SU-MIMO transmission for up to 8 layers per UE and MU-MIMO transmission for up to 2 layers per UE with maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| | DMRS port 0 with SC0 and DMRS port 0, 1 with SC1 used by other UEs | | | | DMRS with SC1 not used |
| 6 | reserved | 6 | reserved | 6 | Rank 8 pattern, DMRS port 0, 1, 2, 3, 4 with SC0 allocated, DMRS port 5, 6, 7 with SC0 not used DMRS with SC1 not used |
| 7 | reserved | 7 | reserved | 7 | Rank 8 pattern, DMRS port 0, 1, 2, 3, 4, 5 with SC0 allocated, DMRS port 6, 7 with SC0 not used DMRS with SC1 not used |
| 8 | reserved | 8 | reserved | 8 | Rank 8 pattern, DMRS port 0, 1, 2, 3, 4, 5, 6 with SC0 allocated, DMRS port 7 with SC0 not used DMRS with SC1 not used |
| 9 | reserved | 9 | reserved | 9 | Rank 8 pattern, DMRS port 0, 1, 2, 3, 4, 5, 6, 7 with SC0 allocated, DMRS with SC1 not used |

The DM-RS antenna port 0 indicates a first antenna port to which the DM-RS is allocated among all of the Reference Signals (RSs). That is, an arbitrary DM-RS antenna port n is indexed in ascending order from the DM-RS antenna port 0.

More specifically, RSs for use in LTE and LTE-A systems include CRSs, MBMS broadcast reference signals, DRSs, Positioning Reference Signals (PRSs), and DM-RSs.

In this case, antenna ports 0 to 3 are allocated for the CRS, antenna port 4 is allocated for the MBMS broadcast reference signal, antenna port 5 is allocated for the DRS, antenna port 6 is allocated for the PRS, and antenna ports 7 to 14 are allocated for DM-RS. In accordance with an embodiment of the present invention, the DM-RS antenna port 0 corresponds to the antenna port 7 and the DM-RS antenna port 1 corresponds to the antenna port 8, and it is assumed that the principle is applied to the following description.

Figure 3:
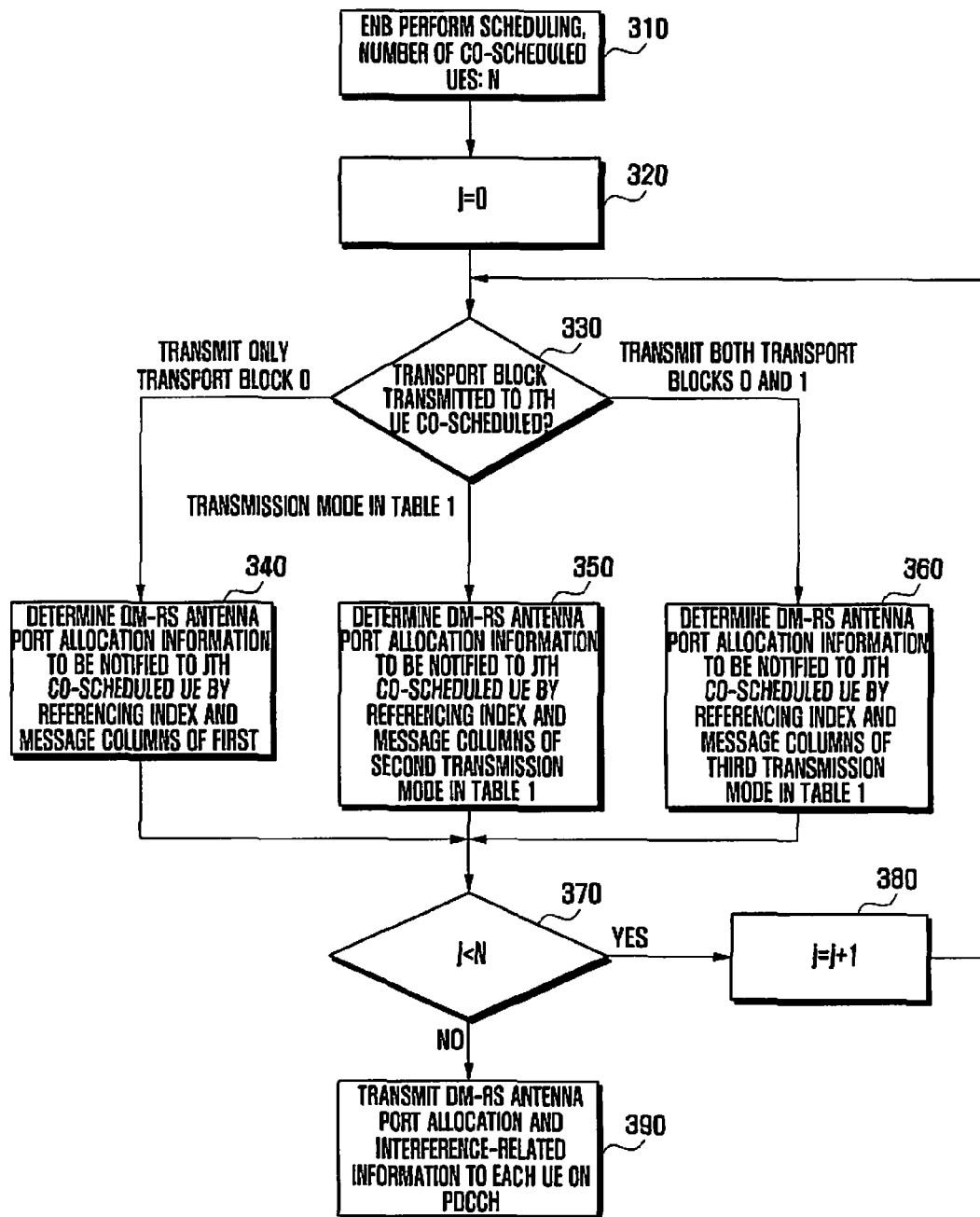
FIG. 3 is a flowchart illustrating a method for an eNB to notify a UE of DM-RS antenna ports allocated to the UE and other UEs scheduled in a same frequency/time resource according to an embodiment of the present invention.

FIG. 3 is a flowchart illustrating a method for an eNB to notify a UE of DM-RS antenna ports allocated to the UE and other UEs scheduled in a same frequency/time resource according to an embodiment of the present invention.

Referring to FIG. 3, the eNB performs scheduling in a specific time/frequency resource in step 310. In the scheduling process, the eNB determines a time/frequency resource to the UE(s) and a data transmission rate for each UE. In step 310 of FIG. 3, the eNB set a number of co-scheduled UEs to N. N=1 indicates an SU-MIMO transmission, and N=2, 3, or 4 indicates an MU-MIMO transmission.

In step 320, the eNB sets an index indicating a DM-RS antenna port allocated to a $j^{th}$ UE. The j is a variable for distinguishing between UEs. The eNB checks a number of transport blocks for the $j^{th}$ UE among the co-scheduled UEs. The number of transport blocks available for a UE is 1 or 2. When transmitting one transport block, the transport block 0 or the transport block 1 can be transmitted.

If it is determined that only the transport block 0 is transmitted, in step 340, the eNB selects the index for notifying the $j^{th}$ UE of the allocated DM-RS port from the index column wherein only transport block 0 is enabled in Table 1. The index column wherein only the transport block 0 is enabled shows the indices for indicating DM-RS antenna ports allocated to the $j^{th}$ UE and other UEs scheduled in a same time/frequency resource when the transport block 0 is enabled and the transport block 1 is disabled.

If it is determined that only the transport block 1 is transmitted, in step 350, the eNB selects the index for notifying the $j^{th}$ UE of the allocated DM-RS port from the index column in Table 1 wherein only transport block 1 is enabled. The index column wherein only transport block 1 is enabled shows the indices for indicating DM-RS antenna ports allocated to the $j^{th}$ UE and other UEs scheduled in a same time/frequency resource when the transport block 1 is enabled and the transport block 1 is disabled.

If it is determined that both the transport blocks 0 and 1 are transmitted, in step 360, the eNB selects the index for notifying the $j^{th}$ UE of the allocated DM-RS port from the index column in Table wherein both the transport blocks are enabled. The index column of Table 1 wherein the both transport blocks are enabled shows the indices for indicating DM-RS antenna ports allocated to the $j^{th}$ UE and other UEs scheduled in a same time/frequency resource when both the transport blocks 0 and 1 are enabled.

In step 370, the eNB determines whether all of the co-scheduled UEs are allocated the respective DM-RS antenna port allocation indices, i.e., j=N. If j is equal to N, all the co-scheduled UEs are assigned the respective DM-RS antenna port allocation indices. If all the co-scheduled UEs are assigned the DM-RS antenna port allocations indices, the eNB transmits the DM-RS antenna port allocation indices to corresponding co-scheduled UEs on a PDCCH in step 390. However, if there is a UE that is not assigned a DM-RS antenna port allocation index, i.e., j<N, the eNB increments j by 1 in step 380 and repeats step 330 to the next co-scheduled UE.

Figure 4:
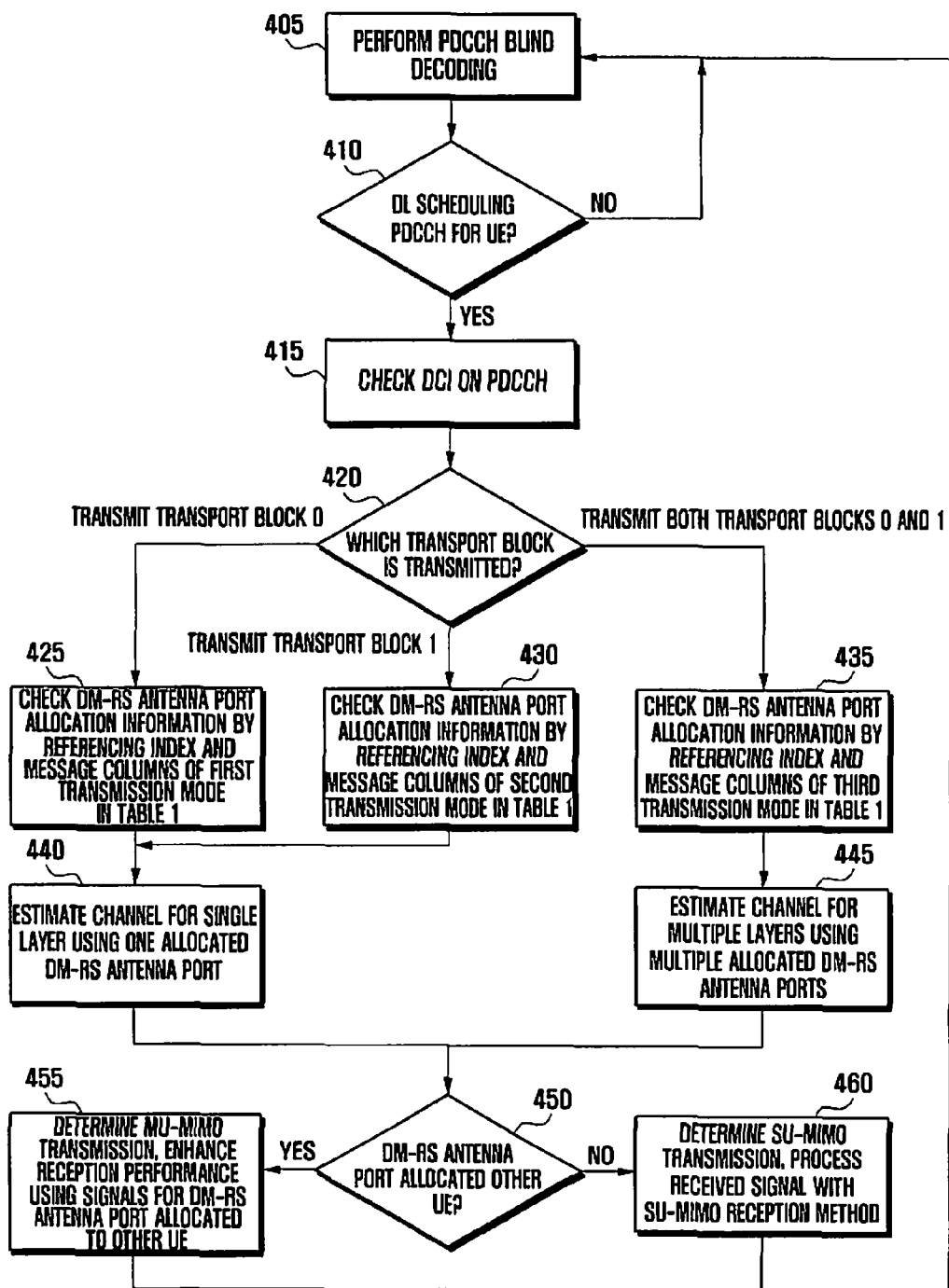
FIG. 4 is a flowchart illustrating a method for a UE to determine DM-RS antenna ports allocated to the UE and other UEs scheduled in a same frequency/time resource based on a DM-RS antenna port allocation index transmitted by an eNB according to an embodiment of the present invention.

FIG. 4 is a flowchart illustrating a method for a UE to determine DM-RS antenna ports allocated to the UE and other UEs scheduled in a same frequency/time resource based on a DM-RS antenna port allocation index transmitted by an eNB according to an embodiment of the present invention.

Referring to FIG. 4, the UE performs PDCCH blind decoding in step 405. The blind decoding is performed on the PDCCH candidates because the UE is not aware of the time/frequency resource on which the PDCCH specific to the UE is transmitted, such that the UE determines the PDCCH candidate decoded without CRC error as the PDCCH carrying its own control information, in the LTE and LTE-A systems.

While performing the blind decoding, the UE determines whether the downlink scheduling PDCCH specific to the UE is received in step 410. If no downlink scheduling PDCCH specific to the UE is received, the UE repeats PDCCH blind decoding in step 405. However, when the downlink scheduling PDCCH specific to the UE is received, the UE checks the Downlink Control Information (DCI) in the PDCCH in step 415. The DCI includes control information on transport blocks 0 and 1, DM-RS antenna port allocation information, and other control information.

In step 420, the UE determines whether any or both of the transport block 0 and the transport block 1 are transmitted, based on the transport block 0 control information 210 and the transport block 1 control information 220 as illustrated in FIG. 2.

When only the transport block 0 is transmitted, in step 425, the UE searches the index column of Table 1 wherein only transport block 0 is enabled for the index indicated by the DM-RS antenna allocation control information 230 of FIG. 2 and checks the information on the allocated DM-RS antenna port through the message detailing the index. Also, the UE can check whether the transmission is MU-MIMO transmission in which multiple UEs are involved and, if so, which DM-RS antenna ports are allocated to other UEs.

When only the transport block 1 is transmitted at step 420, in step 430, the UE searches the index column of Table 1 wherein only transport block 1 is enabled for the index indicated by the DM-RS antenna allocation control information 230 of FIG. 2 and checks the information on the allocated DM-RS antenna port through the message detailing the index. Also, the UE can check whether the transmission is MU-MIMO transmission in which multiple UEs are involved and, if so, which DM-RS antenna ports are allocated to other UEs.

When both the transport block 0 and transport block 1 are transmitted, in step 435, the UE searches the index column of Table 1 wherein both transport blocks are enabled for the index indicated by the DM-RS antenna allocation control information 230 of FIG. 2. Also, the UE can check whether the transmission is MU-MIMO transmission in which multiple UEs are involved and, if so, which DM-RS antenna ports are allocated to other UEs.

In step 440, the UE receives the corresponding transport block, i.e., transport block 0 or transport block 1, transmitted by the eNB, and estimates a channel for the one transmission layer using the single allocated DM-RS antenna port.

In step 445, the UE receives both the transport blocks 0 and 1 transmitted by the eNB, and estimates a channel for the multiple transmission layers using the multiple allocated DM-RS antenna ports.

In step 450, the UE determines whether other UEs are co-scheduled on a same time/frequency resource along with the UE. That is, the UE determines whether the signal destined to the UE is received in an SU-MIMO transmission or an MU-MIMO transmission. Whether the signal is received in the SU-MIMO transmission or the MU-MIMO transmission can be determined based on the information about the other UEs and the DM-RS antenna port allocated to the other UEs that are checked along with the DM-RS antenna port allocation information in steps 425, 430, and 435.

When the UE-specific signal is transmitted in the MU-MIMO transmission, in step 455, the UE detects the signal transmitted through the DM-RS antenna ports allocated to the other UEs and uses this information for improving its own signal reception performance. For example, to improve reception performance, the UE can measure signal strengths of DM-RSs transmitted to the other UEs and use the measurement in the MMSE receiver.

When the UE-specific signal is transmitted in the SU-MIMO transmission, in step 460, the UE processes the received signal according to the SU-MIMO reception scheme under the assumption that there is no other UE co-scheduled in the same time/frequency resource.

After receiving the signal in one of steps 455 and 460, the UE returns to PDCCH blind decoding in step 405.

Table 1 is used to support SU-MIMO and MU-MIMO transmissions having the characteristics as listed under <system characteristics 1> above. In a real LTE-A system, however, an eNB can perform SU-MIMO and MU-MIMO transmissions different from the types in <system characteristics 1>.

Table 2, below, is used for supporting SU-MIMO and MU-MIMO transmissions having characteristics as listed in the following <system characteristics 2>, according to an embodiment of the present invention:

<System Characteristics 2>
1. SU-MIMO transmission for 1-8 layers
2. MU-MIMO transmission for up to 2 layers allocated to a UE
3. MU-MIMO transmission to up to 2 UEs
4. MU-MIMO transmission for up to 4 layers (maximum composite rank of MU-MIMO is 4)

When up to 2 UEs are co-scheduled under the restrictive conditions of the system characteristics 2, the number of cases of DM-RS antenna port allocation and interference-related information reduces, as compared to Table 1. The reduction of the number of cases can be observed by comparing the index columns of Table 2 wherein only the transport block 0 is enabled and wherein only the transport block 1 is enabled with the corresponding index columns of Table 1.

When allocating DM-RS antenna ports using Table 2, 4 bits of information amount are used for identifying up to 10 indices of each transport block transmission case. That is, when using Table 2, DM-RS antenna port allocation and interference-related information of 4 bits is carried in the field 230 of FIG. 2.

TABLE 2

DM-RS antenna port allocation and interference notification in SU-MIMO transmission for up to 8 layers per UE and in MU-MIMO transmission for up to 2 layers per UE with a maximum composite rank 4 (up to 2 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 0 | Rank 2 pattern, DMRS port 0 allocated, DMRS port 1 not used | 0 | Rank 2 pattern, DMRS port 1 allocated, DMRS port 0 used by other UE | 0 | Rank 2 pattern, DMRS port 0, 1 allocated |
| 1 | Rank 2 pattern, DMRS port 0 allocated, DMRS port 1 used by other UE | 1 | Rank 4 pattern, DMRS port 2 allocated, DMRS port 0, 1 used by other UEs, | 1 | Rank 4 pattern, DMRS port 0, 1 allocated, DMRS port 2 used by other UEs, |

TABLE 2-continued

DM-RS antenna port allocation and interference notification in SU-MIMO transmission for up to 8 layers per UE and in MU-MIMO transmission for up to 2 layers per UE with a maximum composite rank 4 (up to 2 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 2 | Rank 4 pattern, DMRS port 0 allocated, DMRS port 2, 3 used by other UEs, DMRS port 1 not used | 2 | DMRS port 3 not used reserved | 2 | Rank 4 pattern, DMRS port 0, 1 allocated, DMRS port 2, 3 used by other UEs |
| 3 | reserved | 3 | reserved | 3 | Rank 4 pattern, DMRS port 2, 3 allocated, DMRS port 0 used by other UEs, DMRS port 1 not used |
| 4 | reserved | 4 | reserved | 4 | Rank 4 pattern, DMRS port 0, 1, 2 allocated, DMRS port 3 not used |
| 5 | reserved | 5 | reserved | 5 | Rank 4 pattern, DMRS port 0, 1, 2, 3 allocated |
| 6 | reserved | 6 | reserved | 6 | Rank 8 pattern, DMRS, port 0, 1, 2, 3, 4 allocated, DMRS port 5, 6, 7 not used |
| 7 | reserved | 7 | reserved | 7 | Rank 8 pattern, DMRS port 0, 1, 2, 3, 4, 5 allocated DMRS port 6, 7 not used |
| 8 | reserved | 8 | reserved | 8 | Rank 8 pattern, DMRS port 0, 1, 2, 3, 4, 5, 6 allocated DMRS port 7 not used |
| 9 | reserved | 9 | reserved | 9 | Rank 8 pattern, DMRS port 0, 1, 2, 3, 4, 5, 6, 7 allocated |

The method for an eNB to determine a DM-RS antenna port allocation index using Table 2 is identical with that described with reference to Table 1 and FIG. 3. Also, the method for a UE to receive and interpret a DM-RS antenna port allocation index is identical with that described with reference to Table 1 and FIG. 4. Accordingly, a repetitive description of the methods using Table 2 will not be provided.

Table 3 shows indices for indicating DM-RS antenna port allocation modes and messages describing the meanings of the indices according to an embodiment of the present invention. Specifically, Table 3 is used to notify DM-RS antenna port allocation for MIMO transmissions as listed in <system characteristics 1>. However, Table 3 differs from Table 2 in the method for distinguishing between the DM-RS patterns and DM-RSs per DM-RS antenna port used for transmitting the DM-RSs. More specifically, the DM-RS patterns and DM-RS per DM-RS antenna port are identified based on scrambling sequence in Table 3, as will be described below.

When the number of layers for an MU-MIMO transmission is 3 or 4, an eNB maps DM-RSs which are Frequency Division Multiplexed (FDMed) and Code Division Multiplexed (CDMed) to the respective DM-RS antenna ports as illustrated in the rank 4 DM-RS pattern 110 of FIG. 1. That is, the DM-RS antenna port 0 is transmitted with Walsh code 0 (+1, +1) of length 2 in blue REs, whereas DM-RS antenna port 3 is transmitted with Walsh code 1 (+1, −1) of length 2 in red REs. Table 3 corresponds to the case where the number of layers for the MU-MIMO transmission is 3 or 4 and the DM-RSs of the individual DM-RS antenna ports are distinguished in the manner using the scrambling sequence.

Another method for identifying the DM-RS antenna ports, when the number of layers for the MU-MIMO transmission is 3 or 4, is to use two scrambling sequences. That is, when the number of layers for the MU-MIMO transmission is 3 or 4, up to 4 DM-RS antenna ports are allocated for the MU-MIMO transmission using the additional scramble sequence at the blue REs without allocating additional REs, i.e. the red Res as shown in the rank 4 DM-RS pattern 110 of FIG. 1. As a result, this method has the same effect to use the rank 2 DM-RS pattern with two scrambling sequences and define both the DM-RS antenna port 0 and DM-RS antenna port 1 per scrambling sequence. That is, for MU-MIMO transmission with 3 or 4 transmission layers, the DM-RS antenna ports can be identified as follows:
 1. DM-RS antenna port 0 using Walsh code 0 with scrambling sequence 0 (SC0)
 2. DM-RS antenna port 1 using Walsh code 1 with scrambling sequence 0 (SC0)
 3. DM-RS antenna port 0 using Walsh code 0 with scrambling sequence 1 (SC1)
 4. DM-RS antenna port 1 using Walsh code 1 with scrambling sequence 1 (SC1)

In the MU-MIMO transmission using 3 or 4 transmission layers, the DM-RS antenna port 0 and DM-RS antenna port 1 are defined per scrambling sequence in order to distinguish among the DM-RS antenna ports. Also, the same effect can be expected when the four cases can be referred to as DM-RS antenna port 0, DM-RS antenna port 1, DM-RS antenna port 2, and DM-RS antenna port 3, respectively.

Figure 5:
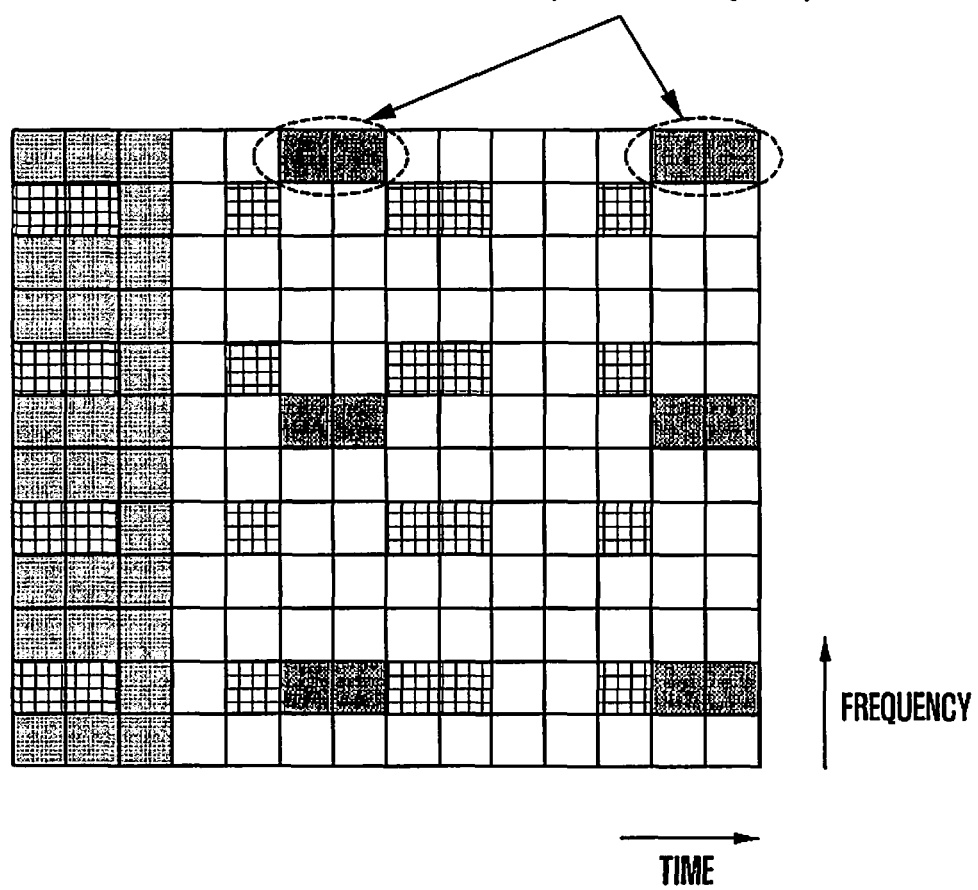
FIG. 5 is a diagram illustrating a DM-RS pattern designed for distinguishing among DM-RS antenna ports in an MU-MIMO transmission using 3 or 4 transmission layers by using two scrambling sequences according to an embodiment of the present invention.

FIG. 5 is a diagram illustrating a DM-RS pattern designed for distinguishing among DM-RS antenna ports in an MU-MIMO transmission using 3 or 4 transmission layers by using two scrambling sequences according to an embodiment of the present invention.

Referring to FIG. 5, the DM-RSs of the 4 DM-RS antenna ports are transmitted on the same REs using two scrambling sequences.

Table 3, below, shows indices for use in DM-RS antenna port information notification and messages describing the meanings of the indices when the DM-RS pattern utilizing the two scrambling sequences is used in the MU-MIMO transmission of the composite rank 3 or 4. In Table 3, it is assumed that the SCrambling sequence (SC) is always 0 in an SU-MIMO transmission.

The theory on the indices for use in the DM-RS antenna port information notification and the messages describing the meanings of the indices in Table 3 is identical with that of Table 1, except that an MU-MIMO transmission of Table 3 uses additional scrambling sequences when the composite rank is 3 and 4, and distinguishes among the DM-RS antenna port signals with the pattern 110 of FIG. 1 only in an SU-MIMO transmission, unlike Table 1, which distinguishes the DM-RS antenna port signals with the pattern 110 of FIG. 1 when the composite rank is 3 or 4, irrespective of whether the transmission is an SU-MIMO or MU-MIMO transmission.

The method for an eNB to determine the DM-RS antenna port allocation index using Table 3 is identical with the method illustrated in FIG. 3 in which Table 1 is used. Also, the method for a UE to receive and interpret the DM-RS antenna port allocation index is identical with the method depicted in FIG. 4 in which Table 1 is used. Accordingly, a repetitive description of the same methods using Table 3 will not be provided.

TABLE 3

DM-RS antenna port allocation and interference notification in an SU-MIMO transmission for up to 8 layers per UE and MU-MIMO transmission for up to 2 layers per UE with a maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 0 | Rank 2 pattern, DMRS port 0 with SC0 allocated, DMRS port 1 with SC0 and DMRS port 0, 1 with SC1 not used | 0 | Rank 2 pattern, DMRS port 1 with SC0 allocated, DMRS port 0 with SC0 used by other UEs, DMRS port 0, 1 with SC1 not used | 0 | Rank 2 pattern, DMRS port 0, 1 with SC0 allocated, DMRS port 0, 1 with SC1 not used |
| 1 | Rank 2 pattern, DMRS port 0 with SC0 allocated, DMRS port 1 with SC0 used by other UEs, DMRS port 0, 1 with SC1 not used | 1 | Rank 2 pattern, DMRS port 0 with SC1 allocated, DMRS port 0, 1 with SC0 used by other UEs, DMRS port 1 with SC1 not used | 1 | Rank 2 pattern, DMRS port 0, 1 with SC0 allocated, DMRS port 0 with SC1 used by other UEs, DMRS port 1 with SC1 not used |
| 2 | Rank 2 pattern, DMRS port 0 with SC0 allocated, DMRS port 1 with SC0 and DMRS port 0 with SC1 used by other UEs, DMRS port 1 with SC1 not used | 2 | Rank 2 pattern, DMRS port 0 with SC1 allocated, DMRS port 0, 1 with SC0 and DMRS port 1 with SC1 used by other UEs | 2 | Rank 4 pattern, DMRS port 0, 1, 2 with SC0 allocated, DMRS port 3 with SC0 not used, DMRS with SC1 not used |
| 3 | Rank 2 pattern, DMRS port 1 with SC0 allocated, DMRS port 0 with SC0 and DMRS port 0 with SC1 used by other UEs, DMRS port 1 with SC1 not used | 3 | Rank 2 pattern, DMRS port 1 with SC1 allocated, DMRS port 0, 1 with SC0 and DMRS port 0 with SC1 used by other UEs | 3 | Rank 2 pattern, DMRS port 0, 1 with SC0 allocated, DMRS port 0, 1 with SC1 used by other UEs |
| 4 | Rank 2 pattern, DMRS port 0 with SC0 allocated, DMRS port 1 with SC0 and DMRS port 0, 1 with SC1 used by other UEs | 4 | reserved | 4 | Rank 2 pattern, DMRS port 0, 1 with SC1 allocated, DMRS port 0, 1 with SC0 used by other UEs |
| 5 | Rank 2 pattern, DMRS port 1 with SC0 allocated, DMRS port 0 with SC0 and DMRS port 0, 1 with SC1 used by other UEs | 5 | reserved | 5 | Rank 4 pattern, DMRS port 0, 1, 2, 3 with SC0 allocated, DMRS with SC1 not used |
| 6 | reserved | 6 | reserved | 6 | Rank 8 pattern, DMRS port 0, 1, 2, 3, 4 with SC0 allocated, DMRS port 5, 6, 7 with SC0 not used, DMRS with SC1 not used |

TABLE 3-continued

DM-RS antenna port allocation and interference notification in an SU-MIMO transmission for up to 8 layers per UE and MU-MIMO transmission for up to 2 layers per UE with a maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 7 | reserved | 7 | reserved | 7 | Rank 8 pattern, DMRS port 0, 1, 2, 3, 4, 5 with SC0 allocated, DMRS port 6, 7 with SC0 not used DMRS with SC1 not used |
| 8 | reserved | 8 | reserved | 8 | Rank 8 pattern, DMRS port 0, 1, 2, 3, 4, 5, 6 with SC0 allocated, DMRS port 7 with SC0 not used DMRS with SC1 not used |
| 9 | reserved | 9 | reserved | 9 | Rank 8 pattern, DMRS port 0, 1, 2, 3, 4, 5, 6, 7 with SC0 allocated, DMRS with SC1 not used |

Referring to Table 3, for an MU-MIMO transmission of composite rank 3 and 4, 4 DM-RS antenna port signals are distinguished from each other using the rank 2 DM-RS pattern with scrambling sequences. Another method for distinguishing among the 4 DM-RS antenna port signals is to apply orthogonal codes of length 4 to the rank 2 DM-RS pattern. That is, in the MU-MIMO transmission of composite rank 3 and 4, the orthogonal codes of length 4 are assigned to the DM-RS antenna ports in the rank 2 DM-RS pattern. In this case, the definitions of Tables 1 and 3 can be used.

For DM-RS antenna port allocation using Table 3, 4 bits of information amount are used for identifying up to 10 indices of each transport block transmission case. That is, when using Table 3, the DM-RS antenna port allocation information and interference-related information of 4 bits are carried in field 230 of FIG. 2.

Tables 1, 2, and 3 show cases where an eNB notifies a UE of an SU-MIMO or MU-MIMO transmission along with DM-RS antenna port allocation information. In accordance with an embodiment of the present invention, a method is provided for the eNB to efficiently notify the UE of the transmission mode, i.e., SU-MIMO or MU-MIMO, with additional information in the LTE-A system while the DM-RS antenna port allocation information and interference-related information are notified to the UE separately.

Figure 6:
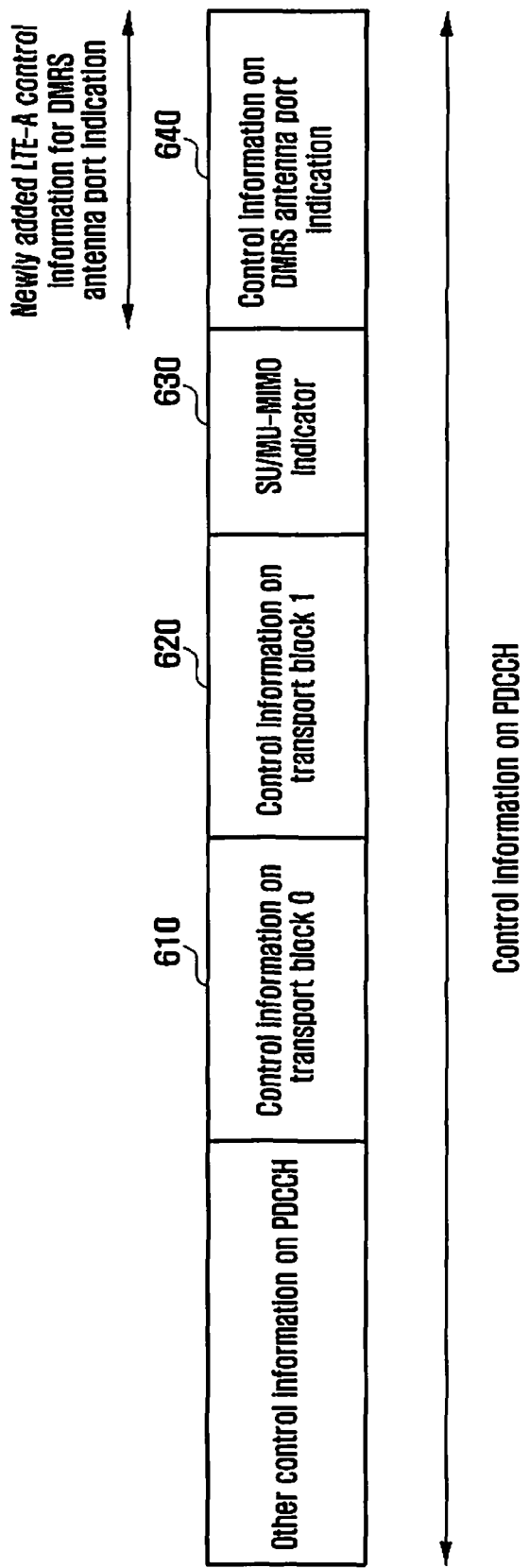
FIG. 6 is diagram illustrating control information carried on a PDCCH for use in an LTE-A system according to an embodiment of the present invention.

FIG. 6 is diagram illustrating control information carried on a PDCCH for use in an LTE-A system according to an embodiment of the present invention. In addition to transport block 0 control information 610 and transport block 1 control information 620, which are similar to the transport block 0 control information 210 and the transport block 1 control information 220, as illustrated in FIG. 2, the control information on the PDCCH includes an SU/MU-MIMO indicator 630 of 1 bit for distinguishing between SU-MIMO and MU-MIMO transmissions and a DM-RS antenna port allocation information 640.

When using the SU/MU-MIMO Indicator 630, an eNB sends the scheduled UE the SU/MU-MIMO Indicator 630 set to 0 for the SU-MIMO transmission and the co-scheduled UEs the SU/MU-MIMO indicator set to 1 for the MU-MIMO transmission. If the SU/MU-MIMO Indicator 630 is set to 0, i.e., SU-MIMO transmission is used, and only one transmission layer is allocated, this means that the transport block 0 is transmitted. That is, for an SU-MIMO transmission with 1 layer, a fixed transport block is transmitted in order to reduce the amount of control information for DM-RS antenna port allocation. For an SU-MIMO transmission with 2, 3, 4, 5, 6, 7, or 8 layers, two transport blocks are transmitted, and the transport block 0 is fixed to be transmitted in order to reduce the amount of control information for DM-RS antenna port allocation.

Additionally, two tables can be used, depending on the value of the SU/MU-MIMO Indicator 630, in order for the eNB to transmit and for the UE to receive the DM-RS antenna port allocation and interference information.

Table 4, below, shows indices indicating DM-RS antenna port allocation modes and messages describing the meanings of the indices in an SU-MIMO transmission using an SU/MU-MIMO Indicator. Specifically, Table 4 includes two columns representing where the transport block 0 is fixedly enabled, and each column of these columns includes two sub-columns representing an index and a message. As compared to Tables 1, 2, and 3, in Table 4, there is no case where transport block 1 is transmitted but the transport block 0 is not.

Because Table 4 is configured to show the DM-RS antenna port allocation information for the SU-MIMO transmission but not the MU-MIMO transmission, no interference-related information is included.

Table 5 shows indices for indicating DM-RS antenna port allocation modes and messages describing the meanings of the indices in an MU-MIMO transmission when using an SU/MU-MIMO Indicator. Specifically, Table 5 includes interference-related information and DM-RS antenna port allocation information.

Tables 4 and 5 are configured in consideration of <system characteristics 1>, as described above.

TABLE 4

DM-RS antenna port allocation and interference notification with an SU/MIMO Indicator (for SU-MIMO)

| Transport Block 0 Enabled Transport Block 1 Disabled | | Transport Block 0 Enabled Transport Block 1 Enabled | |
|---|---|---|---|
| Index | Message | Index | Message |
| 0 | Rank 2 pattern, DMRS port 0 with SC0 allocated | 0 | Rank 2 pattern, DMRS port 0, 1 allocated |
| 1 | reserved | 1 | Rank 4 pattern, DMRS port 0, 1, 2 allocated |
| 2 | reserved | 2 | Rank 4 pattern, DMRS port 0, 1, 2, 3 allocated |
| 3 | reserved | 3 | Rank 8 pattern, DMRS port 0, 1, 2, 3, 4 allocated |
| 4 | reserved | 4 | Rank 8 pattern, DMRS port 0, 1, 2, 3, 4, 5 allocated |
| 5 | reserved | 5 | Rank 8 pattern, DMRS port 0, 1, 2, 3, 4, 5, 6 allocated |
| 6 | reserved | 6 | Rank 8 pattern, DMRS port 0, 1, 2, 3, 4, 5, 6, 7 allocated |

TABLE 5

DM-RS antenna port allocation and interference notification with SU/MU-MIMO Indicator (for MU-MIMO)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 0 | Rank 2 pattern, DMRS port 0 allocated, DMRS port 1 used by other UE | 0 | Rank 2 pattern, DMRS port 1 allocated, DMRS port 0 used by other UE | 0 | Rank 4 pattern, DMRS port 0, 1 allocated, DMRS port 2 used by other UEs, DMRS port 3 not used |
| 1 | Rank 4 pattern, DMRS port 0 allocated, DMRS port 1, 2 used by other UEs, DMRS port 3 not used | 1 | Rank 4 pattern, DMRS port 2 allocated, DMRS port 0, 1 used by other UEs, DMRS port 3 not used | 1 | Rank 4 pattern, DMRS port 0, 1 allocated, DMRS port 2, 3 used by other UEs |
| 2 | Rank 4 pattern, DMRS port 1 allocated, DMRS port 0, 2 used by other UEs, DMRS port 4 not used | 2 | Rank 4 pattern, DMRS port 2 allocated, DMRS port 0, 1, 3 used by other UEs | 2 | Rank 4 pattern, DMRS port 2, 3 allocated, DMRS port 0, 1 used by other UEs |
| 3 | Rank 4 pattern, DMRS port 0 allocated, DMRS port 1, 2, 3 used by other UEs | 3 | Rank 4 pattern, DMRS port 3 allocated, DMRS port 0, 1, 2 used by other UEs | 3 | reserved |
| 4 | Rank 4 pattern, DMRS port 1 allocated, DMRS port 0, 2, 3 used by other UEs | 4 | reserved | 4 | reserved |

When using Table 4 for DM-RS antenna port allocation, 4 bits of information amount are used, i.e., 3 bits for identifying up to 7 indices and 1 bit for the SU/MU-MIMO indicator. That is, when using Table 5, the control information illustrated in FIG. 6 has the SU/MU-MIMO Indicator 630 of 1 bit and the DM-RS antenna port allocation and interference-related control information 640 of 3 bits.

Figure 7A:
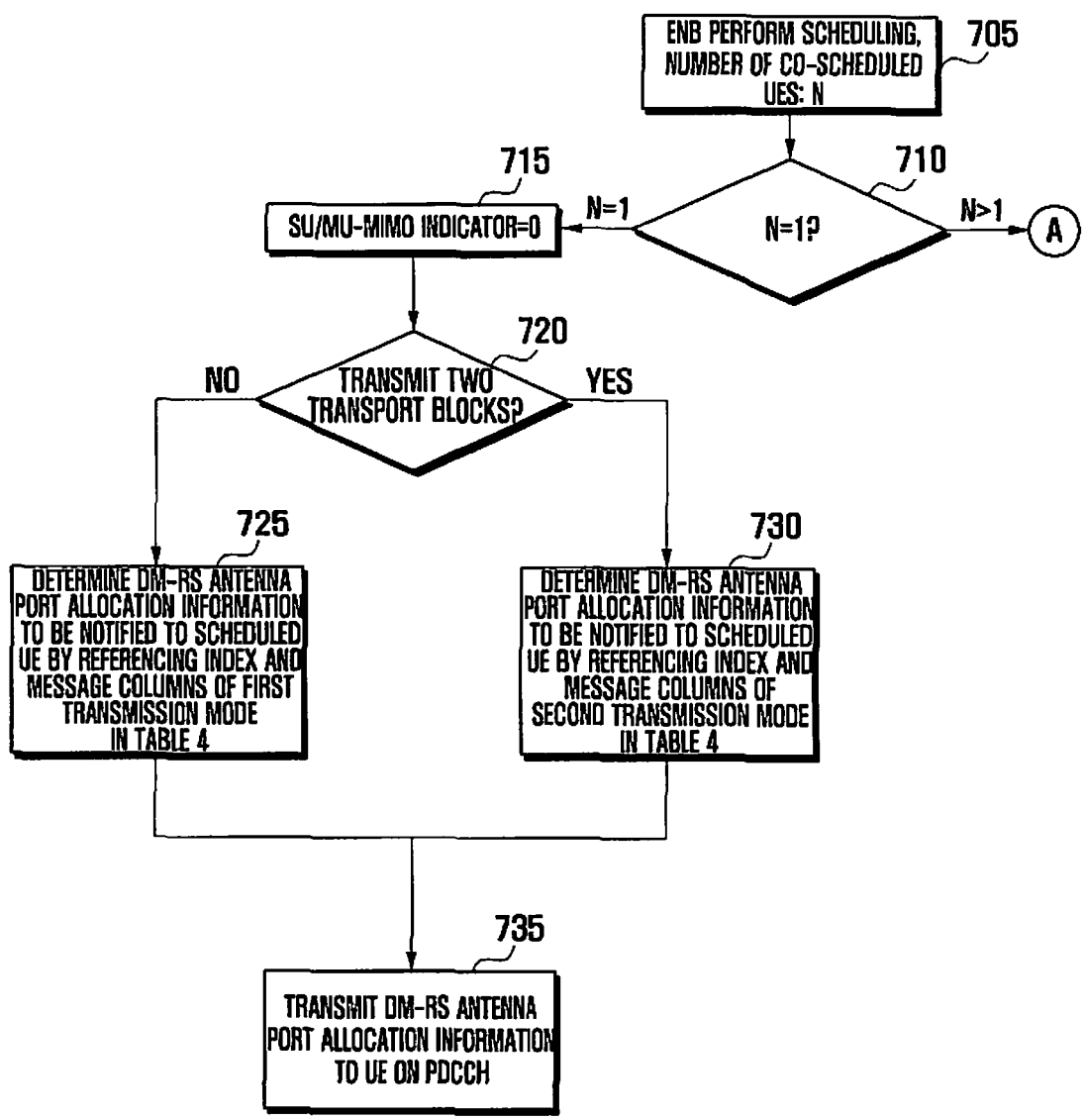
FIGS. 7A and 7B are a flowchart illustrating a method for an eNB to notify a UE of DM-RS antenna port allocation and interference-related information according to an embodiment of the present invention.
Figure 7B:
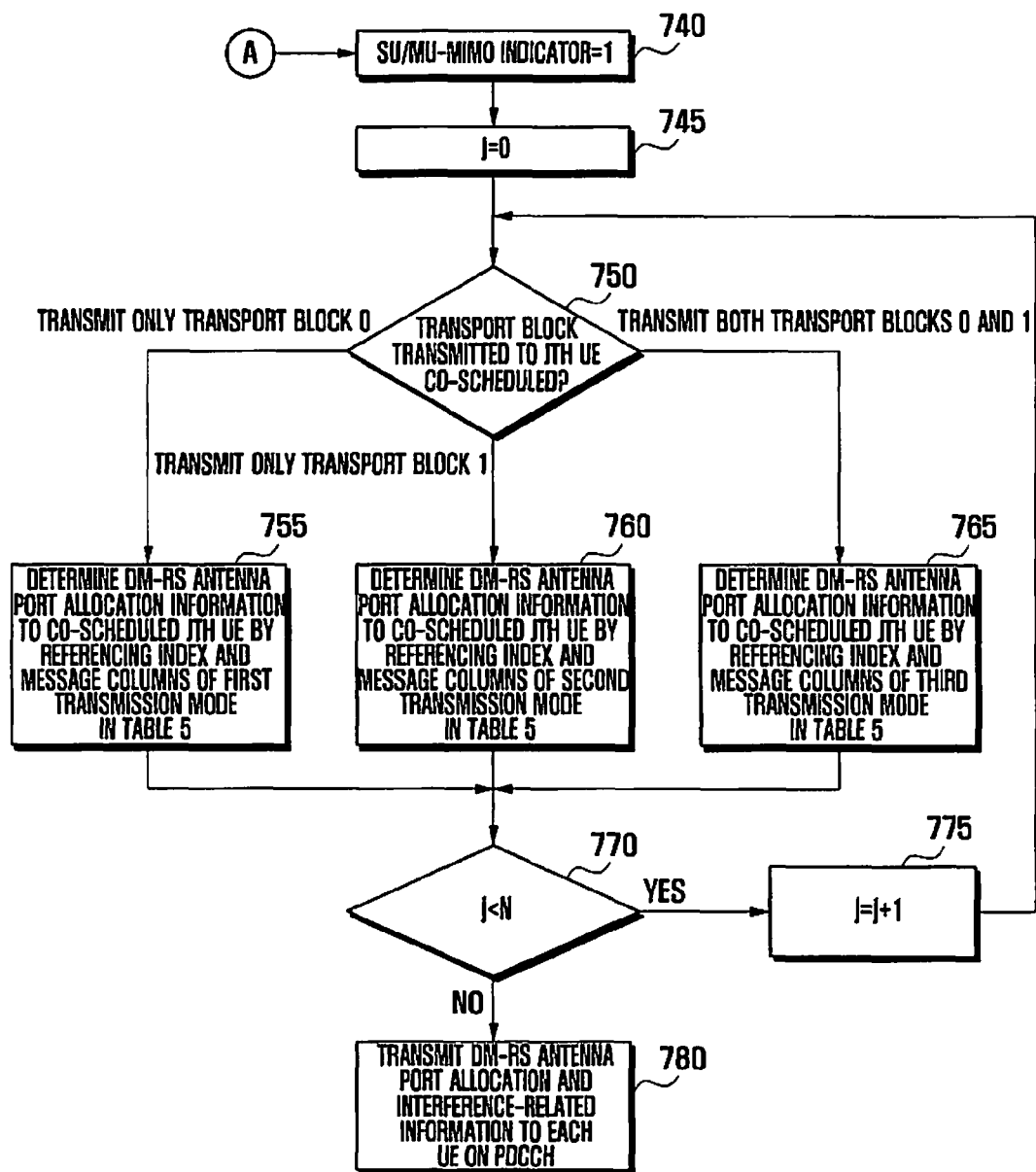

FIGS. 7A and 7B are a flowchart illustrating a method for an eNB to notify a UE of DM-RS antenna port allocation and interference-related information according to an embodiment of the present invention. With the DM-RS antenna port allocation and interference-related information, the UE can check the DM-RS antenna ports allocated to other UEs that are co-scheduled in a same frequency/time resource.

Referring to FIGS. 7A and 7B, the eNB performs scheduling in a specific time/frequency resource in step 705. In the scheduling process, the eNB determines the time/frequency resource to the UE(s) and a data transmission rate for each UE. Further, the eNB sets the number of co-scheduled UEs to N.

After scheduling the UEs, the eNB determines whether the number of scheduled UEs is 1, i.e., if N=1, in step 710. If N−1, SU-MIMO is used; and if N>1, MU-MIMO is used. If N=1 (i.e., SU-MIMO transmission is used), the eNB sets the SU/MU-MIMO indicator to 0 in step 715. In step 720, the eNB determines whether the number of transport blocks to be transmitted in the SU-MIMO mode is 2. If the number of transport blocks is 1, the eNB selects a DM-RS transmission mode index from the index column of the first case of Table 4 in step 725. Otherwise, if the number of transport blocks is 2, the eNB selects a DM-RS transmission mode index from the index column of the second case of Table 4 in step 730. In steps 735, the eNB transmits the DM-RS antenna port allocation index and the SU/MU-MIMO indicator on a PDCCH along with other control information. Because the SU-MIMO transmission is determined by the eNB, the SU/MU-MIMO indicator is set to 0.

When N is greater than 1 in step 710 (i.e., MU-MIMO transmission is necessary), the eNB sets the SU/MU-MIMO indicator to 1 in step 740. Because steps 750 to 770 are identical to step 320 to 370 of FIG. 3, which were already described above, a repetitive detailed description of steps 750 to 770 will not be provided.

Even though 750 to 770 are identical to step 320 to 370 of FIG. 3, step 780 of FIG. 7 is unique in that an SU/MU-MIMO indicator on the PDCCH transmitted to each UE is set to 1. At step 390 of FIG. 3, the SU/MU-MIMO indicator is not used, and therefore, this indication value is not transmitted.

Figure 8B:
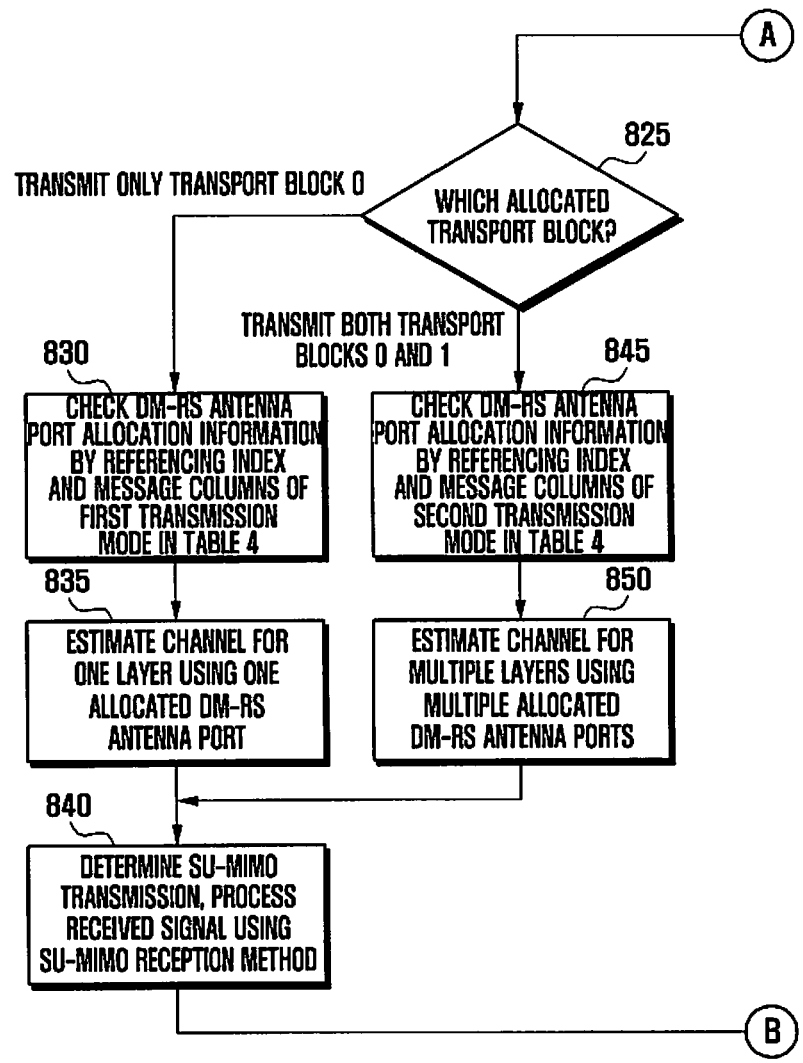

FIGS. 8A and 8B are a flowchart illustrating a method for a UE to determine DM-RS antenna ports allocated to the UE and other UEs scheduled in a same frequency/time resource based on a DM-RS antenna port allocation index and a SU/MU-MIMO indicator transmitted by an eNB according to an embodiment of the present invention.

Referring to FIG. 8A, the UE performs PDCCH blind decoding in step 805. As described above, blind decoding is performed on the PDCCH candidates because the UE is not aware of the time/frequency resource on which the PDCCH specific to the UE is transmitted such that the UE determines the PDCCH candidate decoded without a CRC error as the PDCCH carrying its own control information, in the LTE and LTE-A systems.

While performing the blind decoding, the UE determines whether the downlink scheduling PDCCH specific to the UE is received in step 810. If no downlink scheduling PDCCH specific to the UE is received, the UE repeats PDCCH blinding decoding in step 805. However, if the downlink scheduling PDCCH specific to the UE is received, the UE checks the DCI in the PDCCH in step 815. The DCI includes control information of transport block 0 and transport block 1, an SU/MU-MIMO indicator, DM-RS antenna port allocation control information, and other control information, as illustrated in FIG. 6.

In step 820, the UE determines whether the SU/MU-MIMO indicator of the control information carried on the PDCCH is set to 0 or 1. When the SU/MU-MIMO indicator is set to 0, this indicates an SU-MIMO transmission, and thus the UE determines whether the eNB transmits only the transport block 0 or both the transport blocks 0 and 1 in step 825. When only the transport block 0 is transmitted, in step 830, the UE searches the index column of the first SU-MIMO case of Table 4 for the index contained in the DM-RS antenna port allocation control information field 640 of FIG. 6. The DM-RS antenna port allocation index is used for channel estimation.

In step 835, the UE performs channel estimation for the layer transmitted using the DM-RS antenna port, and in step 840, the UE processes the received signal with the SU-MIMO reception method.

When both the transport blocks 0 and 1 are transmitted at step 825, in step 845, the UE searches the index column of the second SU-MIMO case of Table 4 for the index contained in the DM-RS antenna port allocation control information field 640 of FIG. 6. The DM-RS antenna port allocation index is used for channel estimation.

In step 850, the UE performs channel estimation for the multiple layers transmitted using the DM-RS antenna port and then processes the received signal with the SU-MIMO reception method in step 840.

When the SU/MU-MIMO indicator is set to 1 in step 820, this indicates an MU-MIMO transmission, and thus, the UE determines whether the eNB transmits the transport block 0, the transport block 1, or both the transport blocks 0 and 1 in step 855.

When the eNB transmits only the transport block 0, in step 860, the UE searches the index column of the first MU-MIMO case of Table 5 for the index contained in the DM-RS antenna port allocation control information field 640 of FIG. 6. In step 865, the UE performs channel estimation for the single layer transmitted through the corresponding DM-RS antenna port. In step 870, the UE detects the other DM-RS antenna ports signals, under the assumption that the received signal is a part of the MU-MIMO transmission, and improves the signal reception performance by using the detected other DM-RS antenna ports signals.

When the eNB transmits only the transport block 1 in step 855, in step 875, the UE searches the index column of the second MU-MIMO case of Table 5 for the index contained in the DM-RS antenna port allocation control information field 640 of FIG. 6. Thereafter, UE performs steps 865 and 870.

When the eNB transmits both transport blocks 0 and 1 in step 855, in step 880, the UE searches the index column of the third MU-MIMO case of Table 5 for the index contained in the DM-RS antenna port allocation control information field 640 of FIG. 6. In step 885, the UE performs channel estimation for the multiple layers transmitted through corresponding DM-RS antenna ports. Thereafter, UE performs step 870.

After completing signal reception at step 840 or 870, the UE repeats PDCCH blind decoding in step 805.

As described above, Tables 1, 2, 3, 4, and 5 provide information on a transmission mode (i.e., SU-MIMO transmission or MU-MIMO transmission) and DM-RS antenna ports allocated other UEs that can cause interference in the MU-MIMO transmission as well as the information on the DM-RS antenna port allocated to the UE, scheduled by the eNB. The information on the DM-RS antenna ports allocated to other UEs advantageously improves reception performance of the scheduled UE and also increases control information overhead efficiency.

An embodiment of the present invention proposes a DM-RS antenna port allocation in consideration of whether the transport block 0 and/or transport block 1 are/is transmitted to one UE, without interference-related information. In this case, no interference-related information is transmitted, thereby reducing the amount of control information.

Table 6, below, shows indices for indicating DM-RS antenna port allocation modes and messages describing the meanings of the indices according to an embodiment of the present invention. Specifically, Table 6 is designed for an eNB to notify a target UE of only information on the DM-RS antenna ports allocated to the UE, unlike Tables 1, 2, 3, 4, and 5. When using Table 6, the eNB does not provide the UE with the additional information related to interference, even in an MU-MIMO transmission.

Table 6 is also designed in consideration of <system characteristics 1>, under an assumption that the rank 4 DM-RS pattern is used for composite rank 3 or 4.

Because the method for an eNB to notify a UE of an allocated DM-RS using Table 6 is similar to the method described with reference FIG. 3, detailed description is omitted herein. Basically, the method using Table 6 differs from the method described with reference to FIG. 3 only in that the eNB notifies the UE of the DM-RS antenna port without consideration of interference.

In Table 6, 9 DM-RS antenna port allocation indices are provided for each transmission mode, unlike table 1 in which 10 DM-RS antenna port allocation indices are provided for each transmission mode. The reduction of the number of the indices means that the amount of information to be transmitted is reduced due to the negation of the interference-related information.

TABLE 6

DM-RS antenna port indication method in an SU-MIMO transmission for up to 8 layers per UE and an MU-MIMO transmission for up to 2 layers per UE with a maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 0 | Rank 2 pattern, DMRS port 0 allocated | 0 | Rank 2 pattern, DMRS port 1 allocated | 0 | Rank 2 pattern, DMRS port 0, 1 allocated |
| 1 | Rank 4 pattern, DMRS port 0 allocated | 1 | Rank 4 pattern, DMRS port 2 allocated | 1 | Rank 4 pattern, DMRS port 0, 1 allocated |
| 2 | Rank 4 pattern, DMRS port 1 allocated | 2 | Rank 4 pattern, DMRS port 3 allocated | 2 | Rank 4 pattern, DMRS port 2, 3 allocated |
| 3 | reserved | 3 | reserved | 3 | Rank 4 pattern, DMRS port 0, 1, 2 allocated |
| 4 | reserved | 4 | reserved | 4 | Rank 4 pattern, DMRS port 0, 1, 2, 3 allocated |
| 5 | reserved | 5 | reserved | 5 | Rank 8 pattern, DMRS port 0, 1, 2, 3, 4 allocated |
| 6 | reserved | 6 | reserved | 6 | Rank 8 pattern, DMRS port 0, 1, 2, 3, 4, 5 allocated |
| 7 | reserved | 7 | reserved | 7 | Rank 8 pattern, DMRS port 0, 1, 2, 3, 4, 5, 6 allocated |
| 8 | reserved | 8 | reserved | 8 | Rank 8 pattern, DMRS port 0, 1, 2, 3, 4, 5, 6, 7 allocated |

Table 7, below, shows indices for indicating DM-RS antenna port allocation modes and messages describing the meanings of the indices according to another embodiment of the present invention. Unlike Tables 1, 2, 3, 4, and 5, Table 7 is designed such that an eNB notifies a UE of only the information on a DM-RS antenna port allocated to the corresponding UE. Accordingly, when using Table 7, similar to Table 6, the eNB does not provide the UE with the interference-related information, even in the MU-MIMO transmission.

Table 7 is also designed in consideration of <system characteristics 1> under an assumption that rank 2 DM-RS patterns and two scrambling sequences are used for the composite rank 3 or 4. This is similar to Table 3.

Because the method for the eNB to notify the UE of the allocated DM-RS using Table 7 is similar to the method described with reference FIG. 3, detailed description is omitted herein. Basically, the method using Table 7 differs from the method described with reference to FIG. 3 only in that an eNB notifies a UE of the DM-RS antenna port, without consideration of interference from other UEs.

In Table 7, 8 DM-RS antenna port allocation indices are provided for each transmission mode, unlike table 1 in which 10 DM-RS antenna port allocation indices are provided for each transmission mode. The reduction of the number of the indices means that the amount of information to be transmitted is reduced due to the negation of the interference-related information.

In view of the number of bits, 3 bits are used for notifying the UE of the DM-RS antenna port allocation information and interference-related information when using table 7, as compared to using Table 1, in which 4 bits are used.

TABLE 7

DM-RS antenna port indication method in an SU-MIMO transmission for up to 8 layers per UE and MU-MIMO transmission for up to 2 layers per UE with a maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 0 | Rank 2 pattern, DMRS port 0 with SC0 allocated | 0 | Rank 2 pattern, DMRS port 1 with SC0 allocated | 0 | Rank 2 pattern, DMRS port 0, 1 with SC0 allocated |
| 1 | reserved | 1 | Rank 2 pattern, DMRS port 0 with SC1 allocated | 1 | Rank 4 pattern, DMRS port 0, 1, 2 with SC0 allocated |
| 2 | reserved | 2 | Rank 2 pattern, DMRS port 1 with SC1 allocated | 2 | Rank 2 pattern, DMRS port 0, 1 with SC1 allocated |
| 3 | reserved | 3 | reserved | 3 | Rank 4 pattern, DMRS port 0, 1, 2, 3 with SC0 allocated |
| 4 | reserved | 4 | reserved | 4 | Rank 8 pattern, DMRS port 0, 1, 2, 3, 4 with SC0 allocated |

TABLE 7-continued

DM-RS antenna port indication method in an SU-MIMO transmission for up
to 8 layers per UE and MU-MIMO transmission for up to 2 layers per UE
with a maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 5 | reserved | 5 | reserved | 5 | Rank 8 pattern, DMRS port 0, 1, 2, 3, 4, 5 with SC0 allocated |
| 6 | reserved | 6 | reserved | 6 | Rank 8 pattern, DMRS port 0, 1, 2, 3, 4, 5, 6 with SC0 allocated |
| 7 | reserved | 7 | reserved | 7 | Rank 8 pattern, DMRS port 0, 1, 2, 3, 4, 5, 6, 7 with SC0 allocated |

When using Tables 1 to 7, an eNB notifies a DM-RS antenna port in an initial transmission of Hybrid Automatic Repeat reQuest (HARQ).

In association with a HARQ process, it is required to notify of a case other than the DM-RS antenna port allocations listed in Tables 1 to 7 for retransmission.

In the initial transmission, when one transport block is to be transmitted, the transport block is transmitted on a single layer. However, in the retransmission, when one transport block is transmitted, the transport block can be retransmitted on multiple layers according to an eNB's decision. In order to notify the UE of the DM-RS antenna port allocation for retransmission, in accordance with an embodiment of present invention, additional allocation information is defined with an index that is not used in Tables 1, 2, 3, 4, 5, 6, and 7.

Like Table 7, Table 8, below, is designed in consideration of <system characteristics 1>, under the assumptions that the rank 2 DM-RS patterns and two scrambling sequences are used for the composite rank 3 and 4. Specifically, Table 8 is designed such that an eNB notifies a UE only of the DM-RS antenna port, unlike Table 1, 2, 3, 4, and 5. Accordingly, when using Table 8, the eNB does not provide the UE with the interference-related information, even in an MU-MIMO transmission.

Table 8 differs from Table 7 as follows:

1. In Table 8, it is possible to freely allocate one of 4 combinations of DM-RS antenna ports and scrambling codes even when one of the transport blocks 0 and 1 is transmitted to the UE. That is, when transmitting one transport block, one of the DM-RS antenna port 0 and scrambling sequence 0 combination, DM-RS antenna port 0 and scrambling sequence 1 combination, DM-RS antenna port 1 and scrambling sequence 0, and DM-RS antenna port 1 and scrambling sequence 1. The indices 0, 1, 2, and 3 of the index columns of the first and second transmission modes of Table 8 are the cases.

2. In Table 8, the indices for additional DM-RS antenna port allocation that can be applied for retransmission is defined. The indices 4, 5, 6, and 7 of the index columns of the first and second transmission modes of Table 8.

TABLE 8

DM-RS antenna port indication method in an SU-MIMO transmission for
up to 8 layers per UE and an MU-MIMO transmission for up to 2 layers
per UE with a maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 0 | Rank 2 pattern, DMRS port 0 with SC0 allocated | 0 | Rank 2 pattern, DMRS port 0 with SC0 allocated | 0 | Rank 2 pattern, DMRS port 0, 1 with SC0 allocated |
| 1 | Rank 2 pattern, DMRS port 1 with SC0 allocated | 1 | Rank 2 pattern, DMRS port 1 with SC0 allocated | 1 | Rank 4 pattern, DMRS port 0, 1, 2 with SC0 allocated |
| 2 | Rank 2 pattern, DMRS port 0 with SC1 allocated | 2 | Rank 2 pattern, DMRS port 0 with SC1 allocated | 2 | Rank 2 pattern, DMRS port 0, 1 with SC1 allocated |
| 3 | Rank 2 pattern, DMRS port 1 with SC1 allocated | 3 | Rank 2 pattern, DMRS port 1 with SC1 allocated | 3 | Rank 4 pattern, DMRS port 0, 1, 2, 3 with SC0 allocated |

TABLE 8-continued

DM-RS antenna port indication method in an SU-MIMO transmission for
up to 8 layers per UE and an MU-MIMO transmission for up to 2 layers
per UE with a maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 4 | Rank 2 pattern, DMRS port 0, 1 with SC0 allocated | 4 | Rank 2 pattern, DMRS port 0, 1 with SC0 allocated | 4 | Rank 8 pattern, DMRS port 0, 1, 2, 3, 4 with SC0 allocated |
| 5 | Rank 2 pattern, DMRS port 0, 1 with SC1 allocated | 5 | Rank 2 pattern, DMRS port 0, 1 with SC1 allocated | 5 | Rank 8 pattern, DMRS port 0, 1, 2, 3, 4, 5 with SC0 allocated |
| 6 | Rank 4 pattern, DMRS port 0, 1, 2 with SC0 allocated | 6 | Rank 4 pattern, DMRS port 0, 1, 2 with SC0 allocated | 6 | Rank 8 pattern, DMRS port 0, 1, 2, 3, 4, 5, 6 with SC0 allocated |
| 7 | Rank 4 pattern, DMRS port 0, 1, 2, 3 with SC0 allocated | 7 | Rank 4 pattern, DMRS port 0, 1, 2, 3 with SC0 allocated | 7 | Rank 8 pattern, DMRS port 0, 1, 2, 3, 4, 5, 6, 7 with SC0 allocated |

In Table 8, the index column of each of two transmission modes has 8 indices, unlike Table 1 in which the index column of each transmission mode has 10 indices. The index column of the each transmission mode in Table 8 has 8 indices, irrespective of the number of transport blocks to be transmitted. Accordingly, when using Table 8, 3 bits are used for DM-RS antenna port allocation. Table 8 can be used for DM-RS antenna port allocation for an initial transmission and a retransmission in HARQ process only with 3 bits, unlike Table 7 that also uses 3 bits but does not support retransmission.

The DM-RS antenna port allocation information corresponding to the indices 4, 5, 6, and 7 of the index columns of the first and second transmission modes of Table 8 are available only when one transport block is transmitted and the transport block is retransmitted. In contrast, the DM-RS antenna port allocation information corresponding to the indices 4, 5, 6, and 7 of the index columns of the first and second transmission modes of table 8 are available for an initial transmission and a retransmission.

The first and second transmission modes are identical with each other. Accordingly, Table 8 can be expressed as shown in Table 9.

In Table 9, the first and second transmission modes are unified into one transmission mode, but provide the same results. Additionally, the indices listed in Table 9 are provided as an example, and it is not necessary to use all the indices shown therein. For example, some of the indices can be omitted according to the implementation method.

TABLE 9

DM-RS antenna port indication method in an SU-MIMO
transmission for up to 8 layers per UE and an MU-MIMO
transmission for up to 2 layers per UE with maximum
composite rank 4 (up to 4 co-scheduled UEs)

| One of Transport Block 0 or Transport Block 1 Enabled | | Transport Block 0 Enabled Transport Block 1 Enabled | |
|---|---|---|---|
| Index | Message | Index | Message |
| 0 | Rank 2 pattern, DMRS port 0 with SC0 allocated | 0 | Rank 2 pattern, DMRS port 0, 1 with SC0 allocated |
| 1 | Rank 2 pattern, DMRS port 1 with SC0 allocated | 1 | Rank 4 pattern, DMRS port 0, 1, 2 with SC0 allocated |
| 2 | Rank 2 pattern, DMRS port 0 with SC1 allocated | 2 | Rank 2 pattern, DMRS port 0, 1 with SC1 allocated |
| 3 | Rank 2 pattern, DMRS port 1 with SC1 allocated | 3 | Rank 4 pattern, DMRS port 0, 1, 2, 3 with SC0 allocated |
| 4 | Rank 2 pattern, DMRS port 0, 1 with SC0 allocated | 4 | Rank 8 pattern, DMRS port 0, 1, 2, 3, 4 with SC0 allocated |
| 5 | Rank 2 pattern, DMRS port 0, 1 with SC1 allocated | 5 | Rank 8 pattern, DMRS port 0, 1, 2, 3, 4, 5 with SC0 allocated |
| 6 | Rank 4 pattern, DMRS port 0, 1, 2 with SC0 allocated | 6 | Rank 8 pattern, DMRS port 0, 1, 2, 3, 4, 5, 6 with SC0 allocated |
| 7 | Rank 4 pattern, DMRS port 0, 1, 2, 3 with SC0 allocated | 7 | Rank 8 pattern, DMRS port 0, 1, 2, 3, 4, 5, 6, 7 with SC0 allocated |

As shown in Table 9, when one transport block is transmitted, a maximum rank is 4, and the scrambling sequence (SC) is 0 or 1 when the rank is 1 or 2, and is 0 when the rank is 3 or above. Similarly, when two transport blocks are transmitted, a maximum rank is 8, and the scrambling sequence is 0 or 1 when the rank is 1 or 2, and is 0 when the rank is 3 or above.

In Table 9, when one transport block is transmitted at an initial transmission, DM-RS antenna port allocation indication information is interpreted only for rank 1. When one transport block is transmitted at a retransmission, the DM-RS antenna port allocation indication information is interpreted for all ranks. When two transport blocks are transmitted, at either initial transmission or retransmission, the DM-RS antenna port allocation indication information is interpreted for all ranks.

Figure 9:
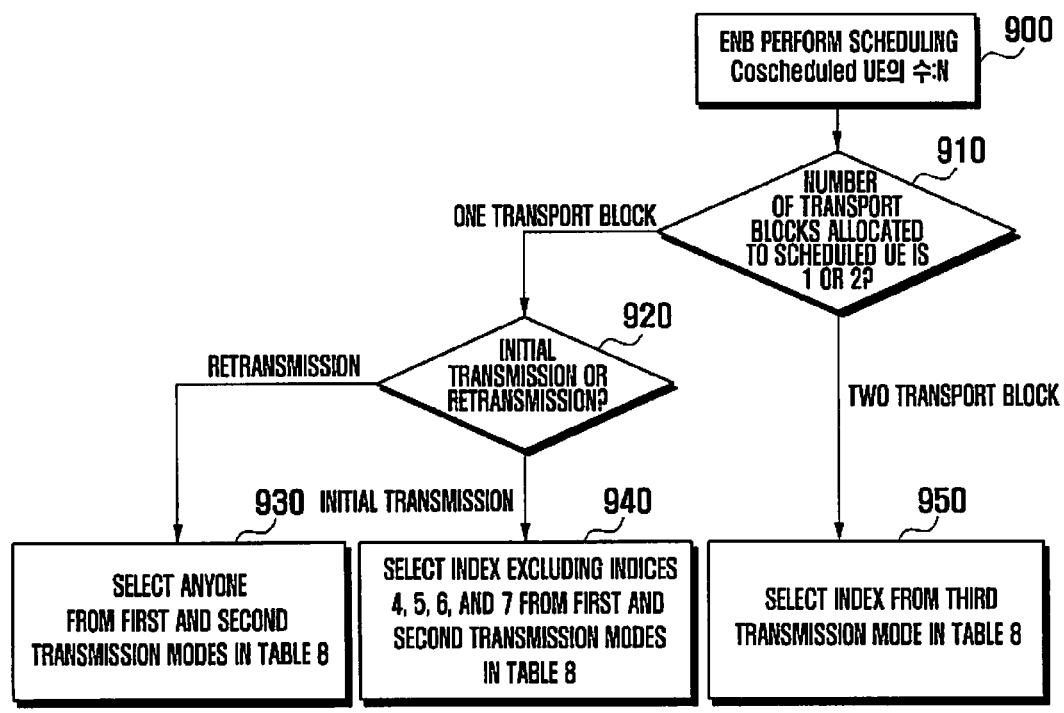
FIG. 9 is a flowchart illustrating a method for allocating DM-RS antenna ports according to an embodiment of the present invention.

FIG. 9 is a flowchart illustrating a method for allocating DM-RS antenna ports using Table 8, according to an embodiment of the present invention. Basically, the eNB checks a number of transport blocks assigned to a UE, selects DM-RS antenna port allocation indication information according to the number of transport blocks, generates control information including information on the number of transport blocks and the selected DM-RS antenna port allocation indication information, and transmits the generated control information to the UE.

More specifically, referring to FIG. 9, the eNB performs scheduling in a subframe in step 900. In step 910, the eNB determines whether to transmit one or two transport blocks to the scheduled UE. According to the number of transport blocks, a different index is selected from Table 8. If is the eNB determines to transmit two transport blocks, the eNB selects the proper index for the DM-RS antenna port allocation information from the index column of the third transmission mode in Table 8 in step 950. When transmitting two transport blocks, the index of the DM-RS antenna port allocation information is selected from the index column of the third transmission mode in Table 8, irrespective of whether the transmission is an initial transmission or a retransmission.

When one transport block is transmitted, the eNB can select different index from table 8 depending on whether the current transmission is an initial transmission or a retransmission of the transport block. Accordingly, when the eNB determines to transmit one transport block in step 910, the eNB determines whether the transmission is the initial transmission or the retransmission of the transport block in step 920.

When the current transmission is the initial transmission, the eNB selects an index from the index column of the first or second transmission modes except the indices 4, 5, 6, and 7 in step 940. However, when the current transmission is the retransmission, the eNB selects anyone from the index column of the first or second transmission modes in step 930.

Figure 10:
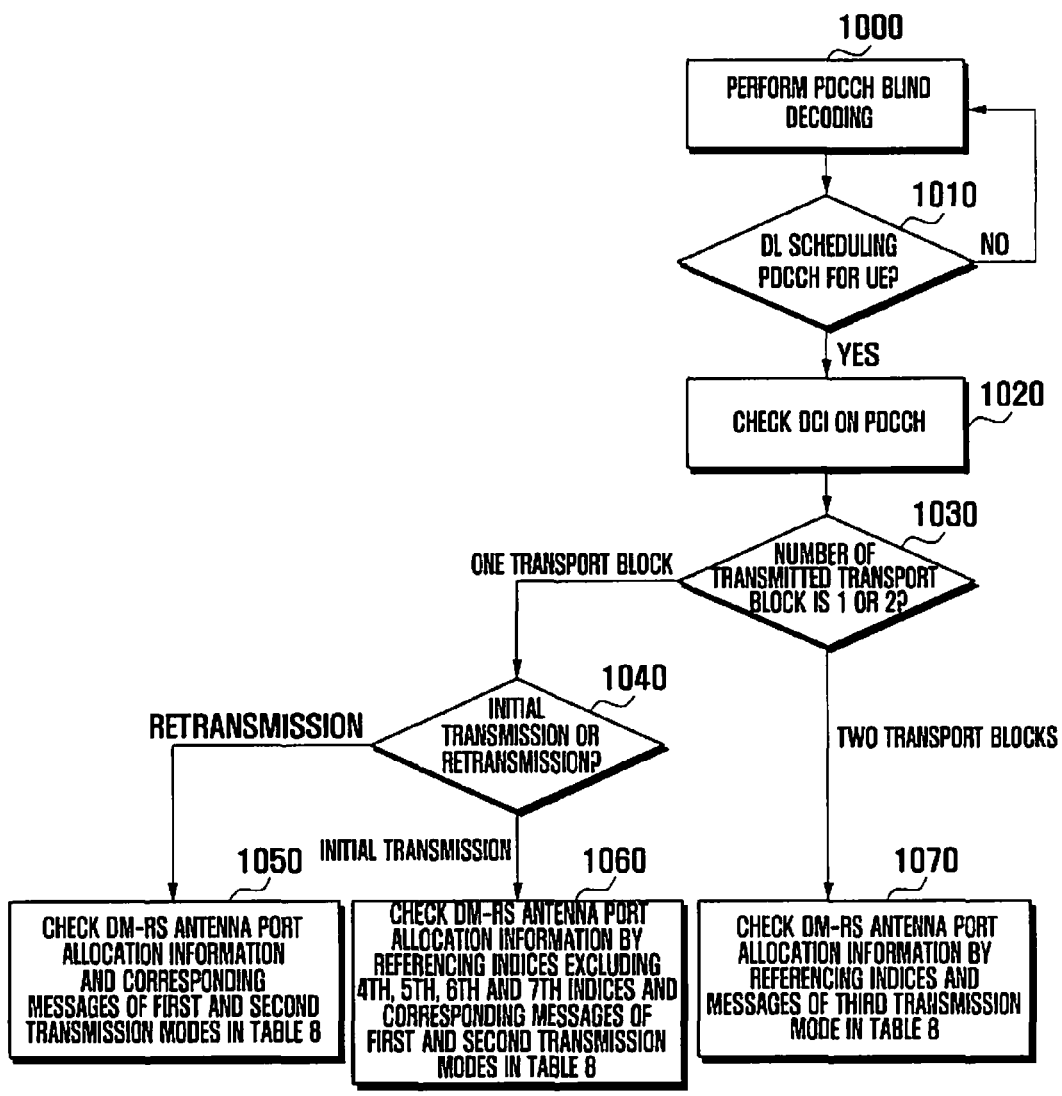
FIG. 10 is a flowchart illustrating a method for acquiring information on allocated DM-RS antenna ports according to an embodiment of the present invention.

FIG. 10 is a flowchart illustrating a method for acquiring information on allocated DM-RS antenna ports using Table 8, according to an embodiment of the present invention. Basically, the UE receives control information including transport block information and DM-RS antenna port allocation indication information, checks a number of transport blocks allocated to the UE based on the transport block information, and interprets the DM-RS antenna port allocation indication information according to the number of transport blocks.

More specifically, referring to FIG. 10, the UE performs PDCCH blind decoding on the received signal in step 1000. In step 1010, the UE determines whether its own downlink scheduling PDCCH is received. When the downlink scheduling PDCCH is received, the UE checks the DCI carried on the PDCCH in step 1020. In step 1030, the UE determines whether the number of transport blocks transmitted is 1 or 2. When the number of transport blocks is 1, the UE determines whether the transmission is an initial transmission or a retransmission of the transport block in step 1040. When the transmission is the retransmission of the transport block, in step 1050, the UE checks the DM-RS antenna port allocated to the UE itself, based on the index of the column of the first and second transmission modes of Table 8 and the DM-RS antenna port allocation information corresponding to the index. However, when the transmission is the initial transmission of the transport block, in step 1060, the UE checks the DM-RS antenna port allocated to the UE itself, based on the index of the column of the first and second transmission modes of Table 8, excluding the indices 4, 5, 6, and 7, and the DM-RS antenna port allocation information corresponding to the index.

When the number of transport blocks is 2, in step 1070, the UE checks the DM-RS antenna port allocated to the UE itself, based on the index of the index column of the third transmission mode in Table 8 and the DM-RS antenna allocation information corresponding to the index. When two transport blocks are transmitted, it is possible to determine the DM-RS antenna port allocated to the UE, irrespective of whether the transmission is an initial transmission or a retransmission.

An example of how to determine whether a transmission is an initial transmission or a retransmission in the methods of FIGS. 9 and 10 is to reference an NDI bit of the control information transmitted by the eNB, as the NDI bit is toggled for a new initial transmission. That is, if a new initial transmission occurs at $(n+1)^{th}$ transmission, the NDI bit set to 0 at the $n^{th}$ transmission is toggled so as to be set to 1. Otherwise, if the transmission is the retransmission, the value of the NDI bit is maintained.

Each of Tables 8 and 9 can be used to notify a UE of DM-RS antenna port allocation information in an initial transmission and a retransmission. Another method for expressing Tables 8 and 9 is to decompose each table into a table for an initial transmission and a table for a retransmission. For example, Table 9 can be divided into Table 10 and Table 11 for an initial transmission and a retransmission, respectively.

TABLE 10

DM-RS antenna port indication method (for an initial transmission) in an SU-MIMO transmission for up to 8 layers per UE and an MU-MIMO transmission for up to 2 layers per UE with a maximum composite rank 3 (up to 4 co-scheduled UEs)

| One of Transport Block 0 or Transport Block 1 Enabled | | Transport Block 0 Enabled Transport Block 1 Enabled | |
| --- | --- | --- | --- |
| Index | Message | Index | Message |
| 0 | Rank 2 pattern, DMRS port 0 with SC0 allocated | 0 | Rank 2 pattern, DMRS port 0, 1 with SC0 allocated |
| 1 | Rank 2 pattern, DMRS port 1 with SC0 allocated | 1 | Rank 4 pattern, DMRS port 0, 1, 2 with SC0 allocated |
| 2 | Rank 2 pattern, DMRS port 0 with SC1 allocated | 2 | Rank 2 pattern, DMRS port 0, 1 with SC1 allocated |
| 3 | Rank 2 pattern, DMRS port 1 with SC1 allocated | 3 | Rank 4 pattern, DMRS port 0, 1, 2, 3 with SC0 allocated |
| 4 | | 4 | Rank 8 pattern, DMRS port 0, 1, 2, 3, 4 with SC0 allocated |
| 5 | | 5 | Rank 8 pattern, DMRS port 0, 1, 2, 3, 4, 5 with SC0 allocated |
| 6 | | 6 | Rank 8 pattern, DMRS port 0, 1, 2, 3, 4, 5, 6 with SC0 allocated |
| 7 | | 7 | Rank 8 pattern, DMRS port 0, 1, 2, 3, 4, 5, 6, 7 with SC0 allocated |

TABLE 11

DM-RS antenna port indication method (for a retransmission) in an SU-MIMO transmission for up to 8 layers per UE and an MU-MIMO transmission for up to 2 layers per UE with a maximum composite rank 4 (up to 4 co-scheduled UEs)

| One of Transport Block 0 or Transport Block 1 Enabled | | Transport Block 0 Enabled Transport Block 1 Enabled | |
|---|---|---|---|
| Index | Message | Index | Message |
| 0 | Rank 2 pattern, DMRS port 0 with SC0 allocated | 0 | Rank 2 pattern, DMRS port 0, 1 with SC0 allocated |
| 1 | Rank 2 pattern, DMRS port 1 with SC0 allocated | 1 | Rank 4 pattern, DMRS port 0, 1, 2 with SC0 allocated |
| 2 | Rank 2 pattern, DMRS port 0 with SC1 allocated | 2 | Rank 2 pattern, DMRS port 0, 1 with SC1 allocated |
| 3 | Rank 2 pattern, DMRS port 1 with SC1 allocated | 3 | Rank 4 pattern, DMRS port 0, 1, 2, 3 with SC0 allocated |
| 4 | Rank 2 pattern, DMRS port 0, 1 with SC0 allocated | 4 | Rank 8 pattern, DMRS port 0, 1, 2, 3, 4 with SC0 allocated |
| 5 | Rank 2 pattern, DMRS port 0, 1 with SC1 allocated | 5 | Rank 8 pattern, DMRS port 0, 1, 2, 3, 4, 5 with SC0 allocated |
| 6 | Rank 4 pattern, DMRS port 0, 1, 2 with SC0 allocated | 6 | Rank 8 pattern, DMRS port 0, 1, 2, 3, 4, 5, 6 with SC0 allocated |
| 7 | Rank 4 pattern, DMRS port 0, 1, 2, 3 with SC0 allocated | 7 | Rank 8 pattern, DMRS port 0, 1, 2, 3, 4, 5, 6, 7 with SC0 allocated |

Tables 8, 9, 10, 10, and 11 are designed in consideration of <system information 1>, under an assumption that the rank 2 DM-RS pattern and two scrambling sequences are used for the composite rank 3 or 4. The rank 4 DM-RS pattern is used with the same <system information 1> characteristics and composite rank 3 or 4, the indices for notifying the DM-RS antenna port information and the messages describing the indices can be proposed as shown in Table 12.

TABLE 12

DM-RS antenna port indication method in an SU-MIMO transmission for up to 8 layers per UE and an MU-MIMO transmission for up to 2 layers per UE with a maximum composite rank 4 (up to 4 co-scheduled UEs)

| Transport Block 0 Enabled Transport Block 1 Disabled | | Transport Block 0 Disabled Transport Block 1 Enabled | | Transport Block 0 Enabled Transport Block 1 Enabled | |
|---|---|---|---|---|---|
| Index | Message | Index | Message | Index | Message |
| 0 | Rank 2 pattern, DMRS port 0 with allocated | 0 | Rank 2 pattern, DMRS port 0 with allocated | 0 | Rank 2 pattern, DMRS port 0, 1 allocated |
| 1 | Rank 2 pattern, DMRS port 1 with allocated | 1 | Rank 2 pattern, DMRS port 1 with allocated | 1 | Rank 4 pattern, DMRS port 0, 1 allocated |
| 2 | Rank 4 pattern, DMRS port 0 with allocated | 2 | Rank 4 pattern, DMRS port 0 with allocated | 2 | Rank 4 pattern, DMRS port 2, 3 allocated |
| 3 | Rank 4 pattern, DMRS port 1 with allocated | 3 | Rank 4 pattern, DMRS port 1 with allocated | 3 | Rank 4 pattern, DMRS port 0, 1, 2 allocated |
| 4 | Rank 4 pattern, DMRS port 2 with allocated | 4 | Rank 4 pattern, DMRS port 2 with allocated | 4 | Rank 4 pattern, DMRS port 0, 1, 2, 3 allocated |
| 5 | Rank 4 pattern, DMRS port 3 with allocated | 5 | Rank 4 pattern, DMRS port 3 with allocated | 5 | Rank 8 pattern, DMRS port 0, 1, 2, 3, 4 allocated |
| 6 | Rank 4 pattern, DMRS port 0, 1 with allocated | 6 | Rank 4 pattern, DMRS port 0, 1 with allocated | 6 | Rank 8 pattern, DMRS port 0, 1, 2, 3, 4, 5 allocated |
| 7 | Rank 4 pattern, DMRS port 2, 3 with allocated | 7 | Rank 4 pattern, DMRS port 2, 3 with allocated | 7 | Rank 8 pattern, DMRS port 0, 1, 2, 3, 4, 5, 6 allocated |
| 8 | Rank 4 pattern, DMRS port 0, 1, 2 with allocated | 8 | Rank 4 pattern, DMRS port 0, 1, 2 with allocated | 8 | Rank 8 pattern, DMRS port 0, 1, 2, 3, 4, 5, 6, 7 allocated |
| 9 | Rank 4 pattern, DMRS port 0, 1, 2, 3 with allocated | 9 | Rank 4 pattern, DMRS port 0, 1, 2, 3 with allocated | 9 | |

In Table 12, indices 6, 7, 8, and 9 of the index columns of the first and second transmission modes and the DM-RS antenna port allocation messages corresponding to the indices are used only for the retransmission. For an initial transmission, the DM-RS antenna port allocation is notified with the indices of the index columns of the first and second transmission mode, excluding indices 6, 7, 8, and 9, and the messages corresponding to the indices.

Table 12 can be expressed as a table having two transmission modes, like Table 9, and can also be divided into two separate tables for an initial transmission and a retransmission, respectively, like Tables 10 and 11.

Table 12 can be used for an eNB to determine DM-RS antenna port allocation information to be transmitted and for a UE to interpret received DM-RS allocation information, like as illustrated FIGS. 8A, 8B, 9, and 10.

Table 13 shows indices for notifying a UE of DM-RS antenna port information and messages describing the meanings of the indices according to an embodiment of the present invention. Unlike Tables 1, 2, 3, 4, 5, 6, and 7, Table 13 is designed such that an eNB notifies of the DM-RS antenna port allocation information and interference-related information when one transport block is transmitted. Table 13 can be used to notify of the DM-RS antenna port allocation for MIMO transmission.

<System Characteristics 3>
1. SU-MIMO transmission for 1 layer
2. MU-MIMO transmission for 1 layer to UE
3. MU-MIMO transmission to up to 4 UEs
4. MU-MIMO transmission for up to 4 layers (maximum composite rank 4 of MU-MIMO)

TABLE 13

DM-RS antenna port and interference indication method in SU and MU-MIMO modes transmitting one transport block per UE with a maximum composite rank 4

| Transport Block 0 Enabled Transport Block 1 Disabled | | Transport Block 0 Disabled Transport Block 1 Enabled | |
|---|---|---|---|
| Index | Message | Index | Message |
| 0 | Rank 2 pattern, DMRS port 0 allocated, DMRS port 1 not used | 0 | Rank 2 pattern, DMRS port 1 allocated, DMRS port 1 used by other UE |
| 1 | Rank 2 pattern, DMRS port 0 allocated, DMRS port 1 used by other UE | 1 | Rank 4 pattern, DMRS port 2 allocated, DMRS port 0, 1 used by other UE, DMRS port 3 not used |
| 2 | Rank 4 pattern, DMRS port 0 allocated, DMRS port 1, 2 used by other UE, DMRS port 3 not used | 2 | Rank 4 pattern, DMRS port 2 allocated, DMRS port 0, 1, 3 used by other UE |
| 3 | Rank 4 pattern, DMRS port 1 allocated, DMRS port 0, 2 used by other UE, DMRS port 3 not used | 3 | Rank 4 pattern, DMRS port 3 allocated, DMRS port 0, 1, 2 used by other UE |
| 4 | Rank 4 pattern, DMRS port 0 allocated, DMRS port 1, 2, 3 used by other UE | 4 | reserved |
| 5 | Rank 4 pattern, DMRS port 1 allocated, DMRS port 0, 2, 3 used by other UE | 5 | reserved |

In Table 13, each index column has 6 indices, unlike Table 1 of which each index column has 10 indices. The number of indices in each index column is reduced by restricting the number of transport blocks per UE to 1. In view of the number of bits, Table 13 allows the eNB to notify the UE of the DM-RS antenna port allocation and interference-related information using only 3 bits, as opposed to Table 1, which uses 4 bits.

Table 14, below, shows indices for notifying a UE of DM-RS antenna port information and messages describing the meanings of the indices according to an embodiment of the present invention. Unlike Tables 1, 2, 3, 4, 5, 6, and 7, Table 14 is designed such that an eNB notifies of the DM-RS antenna port allocation information and interference-related information when one transport block is transmitted. Table 14 is used for notifying of the DM-RS antenna port allocation for MIMO transmission such as <system characteristics 3>. Further, Table 14 is designed under assumptions that the rank 2 DM-RS pattern and two scrambling sequences are used in composite rank 3 or 4. This is similar to Table 3.

In Table 14, the number of indices in each index column is 6, unlike Table 1 in which each index column has 10 indices. The number of indices in each index column is reduced by restricting the number of transport blocks per UE to 1. In view of the number of bits, Table 14 allows the eNB to notify the UE of the DM-RS antenna port allocation and interference-related information with only 3 bits as opposed to Table 1, uses 4 bits.

TABLE 14

DM-RS antenna port and interference indication method in SU and MU-MIMO modes transmitting one transport block per UE with a maximum composite rank 4

| Transport Block 0 Enabled Transport Block 1 Disabled | | Transport Block 0 Disabled Transport Block 1 Enabled | |
|---|---|---|---|
| Index | Message | Index | Message |
| 0 | Rank 2 pattern, DMRS port 0 with SC0 allocated, DMRS port 1 with SC0 and DMRS port 0, 1 with SC1 not used | 0 | Rank 2 pattern, DMRS port 1 with SC0 allocated, DMRS port 0 with SC0 used by other UE |
| 1 | Rank 2 pattern, DMRS port 0 with SC0 allocated, DMRS port 1 with SC0 used by other UE, DMRS port 0, 1 with SC1 not used | 1 | Rank 2 pattern, DMRS port 0 with SC1 allocated, DMRS port 0, 1 with SC0 used by other UE, DMRS port 1 with SC1 not used |
| 2 | Rank 2 pattern, DMRS port 0 with SC0 allocated, DMRS port 1 with SC0 and DMRS port 0 with SC1 used by other UE, DMRS port 1 with SC1 not used | 2 | Rank 2 pattern, DMRS port 0 with SC1 allocated, DMRS port 0, 1 with SC0 and DMRS port 1 with SC1 used by other UE |
| 3 | Rank 2 pattern, DMRS port 1 with SC0 allocated, DMRS port 0 with SC0 and DMRS port 0 with SC1 used by other UE, DMRS port 1 with SC1 not used | 3 | Rank 2 pattern, DMRS port 1 with SC1 allocated, DMRS port 0, 1 with SC0 and DMRS port 0 with SC1 used by other UE |
| 4 | Rank 2 pattern, DMRS port 0 allocated with SC0, DMRS port 1 with SC0 and DMRS port 0, 1 with SC1 used by other UE | 4 | reserved |
| 5 | Rank 2 pattern, DMRS port 1 allocated with SC0, | 5 | reserved |

TABLE 14-continued

DM-RS antenna port and interference indication method in SU and MU-MIMO modes transmitting one transport block per UE with a maximum composite rank 4

| Transport Block 0 Enabled Transport Block 1 Disabled | | Transport Block 0 Disabled Transport Block 1 Enabled |
|---|---|---|
| Index | Message | Index Message |
| | DMRS port 0 with SC0 and DMRS port 0, 1 with SC1 used by other UE | |

In the above DM-RS antenna port allocation method, a specific DM-RS antenna port has been mentioned. For example, when the transport blocks 0 and 1 are transmitted in Table 7, the index 5 indicates the allocation of DM-RS antenna ports 0, 1, 2, 3, 4, and 5 with scrambling code 0. However, the present invention can be applied to the DM-RS antenna port combination other than the DM-RS antenna port combination as described above. According to an embodiment of the present invention, when the transport blocks 0 and 1 are transmitted simultaneously in Table 7, the index 5 can be identically applied to the case where the scrambling code 0 is used and the DM-RS antenna ports 0, 1, 2, 5, 6, and 7 are allocated, rather than the DM-RS antenna ports 0, 1, 2, 3, 4, and 5.

Figure 11:
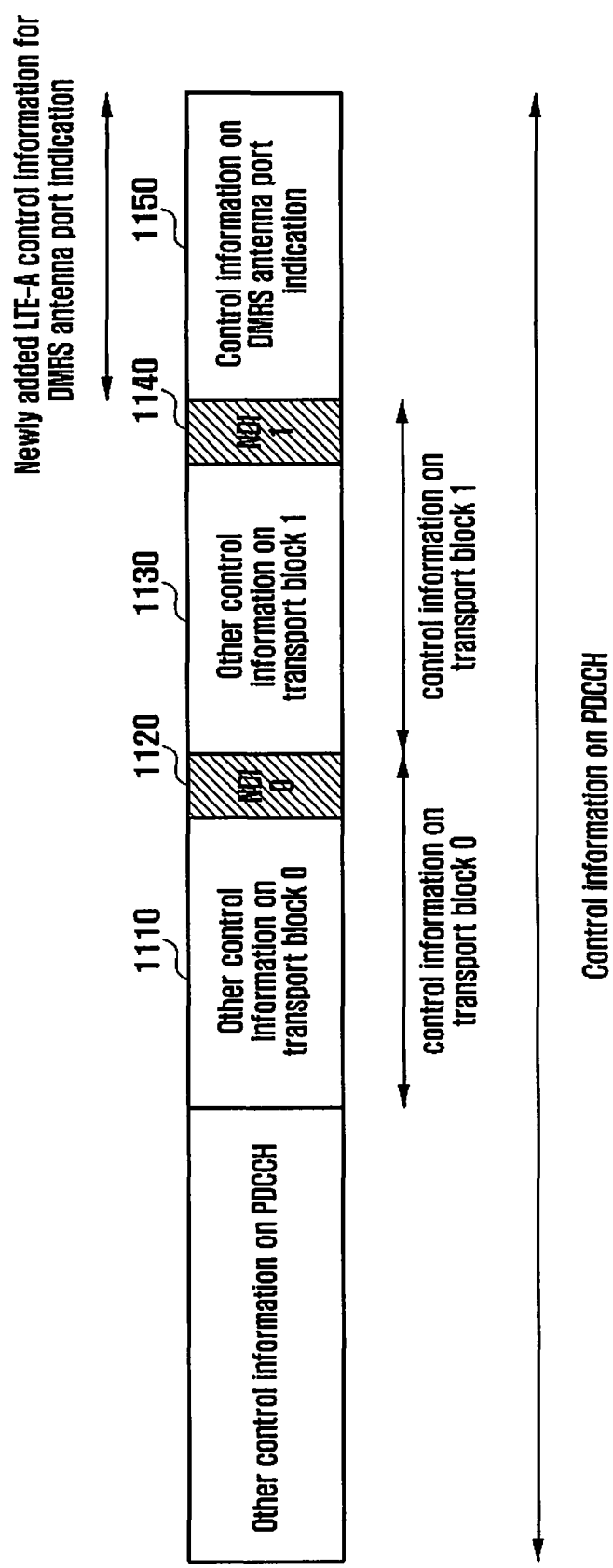
FIG. 11 is a diagram illustrating control information carried on a PDCCH for use in an LTE-A system according to an embodiment of the present invention.

FIG. 11 is a diagram illustrating control information carried on a PDCCH for use in an LTE-A system according to an embodiment of the present invention.

Referring to FIG. 11, control information carried on a PDCCH is identical with that illustrated in FIG. 2, except that the control information on each transport block is divided into an NDI bit and other control information. The fields 1110 and 1120 carry the control information on the transport block 0, and the fields 1130 and 1140 carry the control information on the transport block 1. More specifically, the NDI fields 1120 and 1140 carry the control information indicating whether the transport blocks 0 and 1 are initial transmissions in the HARQ process. When the transport block 0 is not transmitted, the NDI 0 bit can be used for another purpose, rather than a notification of HARQ initial transmission or retransmission.

Table 15 shows indices for indicating a DM-RS antenna port allocation and transmission mode with an NDI bit for a transport block that is not transmitted according to an embodiment of the present invention.

TABLE 15

DM-RS antenna port and transmit diversity indication method in an SU-MIMO transmission for up to 8 layers per UE and an MU-MIMO transmission for up to 2 layers per UE with a maximum composite rank 4 (maximum 4 co-scheduled UEs)

| One of Transport Block 0 or Transport Block 1 Enabled | | | | Transport Block 0 Enabled Transport Block 1 Enabled | |
|---|---|---|---|---|---|
| NDI x = 0 | | NDI x = 1 | | | |
| Index | Message | Index | Message | Index | Message |
| 0 | Transmit Diversity with CRS | 0 | Rank 2 pattern, DMRS port 0 with SC0 allocated | 0 | Rank 2 pattern, DMRS port 0, 1 with SC0 allocated |
| 1 | Reserved | 1 | Rank 2 pattern, DMRS port 1 with SC0 allocated | 1 | Rank 4 pattern, DMRS port 0, 1, 2 with SC0 allocated |
| 2 | Reserved | 2 | Rank 2 pattern, DMRS port 0 with SC1 allocated | 2 | Rank 2 pattern, DMRS port 0, 1 with SC1 allocated |
| 3 | Reserved | 3 | Rank 2 pattern, DMRS port 1 with SC1 allocated | 3 | Rank 4 pattern, DMRS port 0, 1, 2, 3 with SC0 allocated |
| 4 | Reserved | 4 | Rank 2 pattern, DMRS port 0, 1 with SC0 allocated | 4 | Rank 8 pattern, DMRS port 0, 1, 2, 3, 4 with SC0 allocated |
| 5 | Reserved | 5 | Rank 2 pattern, DMRS port 0, 1 with SC1 allocated | 5 | Rank 8 pattern, DMRS port 0, 1, 2, 3, 4, 5 with SC0 allocated |
| 6 | Reserved | 6 | Rank 4 pattern, DMRS port 0, 1, 2 with SC0 allocated | 6 | Rank 8 pattern, DMRS port 0, 1, 2, 3, 4, 5, 6 with SC0 allocated |
| 7 | Reserved | 7 | Rank 4 pattern, DMRS port 0, 1, 2, 3 with SC0 allocated | 7 | Rank 8 pattern, DMRS port 0, 1, 2, 3, 4, 5, 6, 7 with SC0 allocated |

In Table 15, NDI x is an NDI bit for the transport block which is not transmitted and can be used to notify the UE of the transmission mode in one transport block. In Tables 1 to 14, only the transmission mode, i.e., SU-MIMO or MU-MIMO, can be notified to the UE. In Table 15, it is possible to notify the UE of the further information, such as whether transmit diversity is used, by using an NDI bit for a transport block which is not transmitted, when only one transport block is transmitted. The transmit diversity is available when a CRS is used, and it is possible to use only the Space Frequency Block Code (SFBC) or both the Frequency Selective Transmit Diversity (FSTD) and SFBC depending on the number of CRS antenna ports. That is, when the CRS for two antenna ports are transmitted, the transmit diversity is automatically configured with SFBC, and when the CRS for four antenna ports are transmitted, the transmit diversity is automatically configured with FSTC+SFBC. In contrast, if the CRS for a signal antenna port is transmitted, the transmit diversity is unavailable and thus the single port transmitted is automatically configured.

Table 15 is designed for cases where an SFBC is used or both an FSTD and an SFBC are used. In an LTE-A system, it is possible to use transmit diversity based on a DM-RS as well as transmit diversity based on a CRS. When using a DM-RS, transmit diversity can be implemented as follows:

1. SFBC with DM-RS antenna ports 0 and 1; and
2. FSTD+SFBC with DM-RS antenna ports 0, 1, 3, and 3.

Table 16 shows indices indicating a DM-RS port and transmission mode with an NDI bit for a transport block, which is not transmitted, and messages describing the meanings of the indices according to an embodiment of the present invention.

based transmit diversity are supported. In order to support both the CRS-based transmit diversity and DM-RS-based transmit diversity, Tables 15 and 16 are modified into one table.

Table 17 shows indices indicating a DM-RS port and a transmission mode with an NDI bit for a transport block that is not transmitted according to an embodiment of the present invention.

When using Table 17, an eNB to notifies a UE of information on whether a transmission is a retransmission and whether transmit diversity is applied and the DM-RS antenna port allocation with an NDI bit for a transport block which is not transmitted. When only one transmit block is transmitted, if the NDI bit for the transport block which is not transmitted is set to 0, this NDI bit can be used for notifying the UE of the use of transmit diversity or the retransmission of the transport block. When using Table 17,

TABLE 16

DM-RS antenna port and transmit diversity indication method in an SU-MIMO for up to 8 layers per UE and an MU-MIMO for up to 2 layers per UE with a maximum composite rank 4 (maximum 4 co-scheduled UE)

| One of Transport Block 0 or Transport Block 1 Enabled | | | | Transport Block 0 Enabled Transport Block 1 Enabled | |
|---|---|---|---|---|---|
| NDI x = 0 | | NDI x = 1 | | | |
| Index | Message | Index | Message | Index | Message |
| 0 | No Transmit Diversity with DMRS port 0 with SC0 | 0 | Rank 2 pattern, DMRS port 0 with SC0 allocated | 0 | Rank 2 pattern, DMRS port 0, 1 with SC0 allocated |
| 1 | Transmit Diversity with DMRS port 0, 1 with SC0 | 1 | Rank 2 pattern, DMRS port 1 with SC0 allocated | 1 | Rank 4 pattern, DMRS port 0, 1, 2 with SC0 allocated |
| 2 | Transmit Diversity with DMRS port 0, 1, 2, 3 with SC0 | 2 | Rank 2 pattern, DMRS port 0 with SC1 allocated | 2 | Rank 2 pattern, DMRS port 0, 1 with SC1 allocated |
| 3 | Reserved | 3 | Rank 2 pattern, DMRS port 1 with SC1 allocated | 3 | Rank 4 pattern, DMRS port 0, 1, 2, 3 with SC0 allocated |
| 4 | Reserved | 4 | Rank 2 pattern, DMRS port 0, 1 with SC0 allocated | 4 | Rank 8 pattern, DMRS port 0, 1, 2, 3, 4 with SC0 allocated |
| 5 | Reserved | 5 | Rank 2 pattern, DMRS port 0, 1 with SC1 allocated | 5 | Rank 8 pattern, DMRS port 0, 1, 2, 3, 4, 5 with SC0 allocated |
| 6 | Reserved | 6 | Rank 4 pattern, DMRS port 0, 1, 2, with SC0 allocated | 6 | Rank 8 pattern, DMRS port 0, 1, 2 3, 4, 5, 6 with SC0 allocated |
| 7 | Reserved | 7 | Rank 4 pattern, DMRS port 0, 1, 2, 3 with SC0 allocated | 7 | Rank 8 pattern, DMRS port 0, 1, 2, 3, 4, 5, 6, 7 with SC0 allocated |

When using Table 16, it is possible to notify the UE of the information on whether the transport block is transmitted with transmit diversity and which transmit diversity scheme is used, by using an NDI bit for a transport block that is not transmitted.

Specifically, Table 15 is designed to notify of the transmit diversity scheme with a CRS, and Table 16 is designed to notify of the transmit diversity scheme with a DM-RS. In accordance with another embodiment of the present invention, both the CRS-based transmit diversity and the DM-RSif the NDI x for the transport block that is not transmitted is set to 0 and the index is 0, transmit diversity is notified to the UE. The transmit diversity can be applied to both the HARQ initial transmission and retransmission. In order to simplify the system design, it is possible to configure design such that transmit diversity can applied to one of the HARQ initial transmission or retransmission. When the transmit diversity is applied to only HARQ retransmission, the NDI x becomes the value for determining whether the transmission is HARQ retransmission.

TABLE 17

DM-RS antenna port and transmit diversity indication method in an SU-MIMO for up to 8 layers per UE and an MU-MIMO for up to 2 layers per UE with a maximum composite rank 4 (maximum 4 co-scheduled UEs)

| One of Transport Block 0 or Transport Block 1 Enabled | | | | Transport Block 0 Enabled Transport Block 1 Enabled | |
|---|---|---|---|---|---|
| NDI x = 0 | | NDI x = 1 | | | |
| Index | Message | Index | Message | Index | Message |
| 0 | Transmit Diversity with CRS (Initial Tx or ReTx) | 0 | Rank 2 pattern, DMRS port 0 with SC0 allocated | 0 | Rank 2 pattern, DMRS port 0, 1 with SC0 allocated |
| 1 | Rank 2 pattern, DMRS port 0, 1 with SC0 allocated (Retx) | 1 | Rank 2 pattern, DMRS port 1 with SC0 allocated | 1 | Rank 4 pattern, DMRS port 0, 1, 2 with SC0 allocated |
| 2 | Rank 2 pattern, DMRS port 0, 1 with SC1 allocated (Retx) | 2 | Rank 2 pattern, DMRS port 0 with SC1 allocated | 2 | Rank 2 pattern, DMRS port 0, 1 with SC1 allocated |
| 3 | Rank 4 pattern, DMRS port 0, 1, 2 with SC0 allocated (Retx) | 3 | Rank 2 pattern, DMRS port 1 with SC1 allocated | 3 | Rank 4 pattern, DMRS port 0, 1, 2, 3 with SC0 allocated |
| 4 | Rank 4 pattern, DMRS port 0, 1, 2, 3 with SC0 allocated (Retx) | 4 | Reserved | 4 | Rank 8 pattern, DMRS port 0, 1, 2, 3, 4 with SC0 allocated |
| 5 | Reserved | 5 | Reserved | 5 | Rank 8 pattern, DMRS port 0, 1, 2, 3, 4, 5 with SC0 allocated |
| 6 | Reserved | 6 | Reserved | 6 | Rank 8 pattern, DMRS port 0, 1, 2, 3, 4, 5, 6 with SC0 allocated |
| 7 | Reserved | 7 | Reserved | 7 | Rank 8 pattern, DMRS port 0, 1, 2, 3, 4, 5, 6, 7 with SC0 allocated |

Using Tables 15, 16, and 17, it is possible to notify a UE of one of the SU-MIMO, MU-MIMO, and transmit diversity along with the DM-RS port allocation information with the NDI bit. According to an embodiment of the present invention, another usage of an NDI bit for a transmit block that is not transmitted is for notifying of synchronous HARQ.

Table 18 shows indices indicating a DM-RS port allocation and synchronous HARQ transmission with an NDI bit for a transport block that is not transmitted and messages describing the meanings of the indices.

TABLE 18

DM-RS antenna port and synchronous HARQ indication method in an SU-MIMO transmission for up to 8 layers per UE and an MU-MIMO transmission for up to 2 layers per UE with a maximum composite rank 4 (maximum 4 co-scheduled UEs)

| One of Transport Block 0 or Transport Block 1 Enabled | | | | Transport Block 0 Enabled Transport Block 1 Enabled | |
|---|---|---|---|---|---|
| NDI x = 0 | | NDI x = 1 | | | |
| Index | Message | Index | Message | Index | Message |
| 0 | Rank 2 pattern, DMRS port 0 with SC0 allocated (Synchronous HARQ) | 0 | Rank 2 pattern, DMRS port 0 with SC0 allocated | 0 | Rank 2 pattern, DMRS port 0, 1 with SC0 allocated |
| 1 | Rank 2 pattern, DMRS port 1 with SC0 allocated (Synchronous HARQ) | 1 | Rank 2 pattern, DMRS port 1 with SC0 allocated | 1 | Rank 4 pattern, DMRS port 0, 1, 2 with SC0 allocated |
| 2 | Rank 2 pattern, DMRS port 0 with SC1 allocated | 2 | Rank 2 pattern, DMRS port 0 with SC1 allocated | 2 | Rank 2 pattern, DMRS port 0, 1 with SC1 allocated |

TABLE 18-continued

DM-RS antenna port and synchronous HARQ indication method in an SU-MIMO transmission for up to 8 layers per UE and an MU-MIMO transmission for up to 2 layers per UE with a maximum composite rank 4 (maximum 4 co-scheduled UEs)

| | One of Transport Block 0 or Transport Block 1 Enabled | | | Transport Block 0 Enabled Transport Block 1 Enabled | |
|---|---|---|---|---|---|
| | NDI x = 0 | | NDI x = 1 | | |
| Index | Message | Index | Message | Index | Message |
| 3 | Rank 2 pattern, DMRS port 1 with SC1 allocated (Synchronous HARQ) | 3 | Rank 2 pattern, DMRS port 1 with SC1 allocated | 3 | Rank 4 pattern, DMRS port 0, 1, 2, 3 with SC0 allocated |
| 4 | Rank 2 pattern, DMRS port 0, 1 with SC0 allocated (Synchronous HARQ) | 4 | Rank 2 pattern, DMRS port 0, 1 with SC0 allocated | 4 | Rank 8 pattern, DMRS port 0, 1, 2, 3, 4 with SC0 allocated |
| 5 | Rank 2 pattern, DMRS port 0, 1 with SC1 allocated (Synchronous HARQ) | 5 | Rank 2 pattern, DMRS port 0, 1 with SC1 allocated | 5 | Rank 8 pattern, DMRS port 0, 1, 2, 3, 4, 5 with SC0 allocated |
| 6 | Rank 4 pattern, DMRS port 0, 1, 2 with SC0 allocated (Synchronous HARQ) | 6 | Rank 4 pattern, DMRS port 0, 1, 2 with SC0 allocated | 6 | Rank 8 pattern, DMRS port 0, 1, 2, 3, 4, 5, 6 with SC0 allocated |
| 7 | Rank 4 pattern, DMRS port 0, 1, 2, 3 with SC0 allocated (Synchronous HARQ) | 7 | Rank 4 pattern, DMRS port 0, 1, 2, 3 with SC0 allocated | 7 | Rank 8 pattern, DMRS port 0, 1, 2, 3, 4, 5, 6, 7 with SC0 allocated |

Using Table 18, it is possible to notify a UE of information on whether a transport block is transmitted in synchronous HARQ by using an NDI bit for a transport block that is not transmitted. Because the synchronous HARQ retransmission occurs periodically, there is no need to transmit additional PDCCH for the retransmission. However, the synchronous HARQ has a drawback in that it does not dynamically adapt a time-varying radio channel. By designing Table 18 to support the synchronous HARQ in the single codeword transmission, it is possible to perform notification with Table 17, when the radio channel environment becomes proper for the synchronous HARQ, resulting in performance optimization.

Table 19 shows indices indicating a DM-RS port and synchronous HARQ transmission with an NDI bit for a transport block that is not transmitted and messages describing the meanings of the indices according to an embodiment of the present invention.

TABLE 19

DM-RS antenna port and synchronous HARQ indication method in an SU-MIMO transmission for up to 8 layers per UE and an MU-MIMO transmission for up to 2 layers per UE with a maximum composite rank 4 (maximum 4 co-scheduled UEs)

| | One of Transport Block 0 or Transport Block 1 Enabled | | | Transport Block 0 Enabled Transport Block 1 Enabled | |
|---|---|---|---|---|---|
| | NDI x = 0 | | NDI x = 1 | | |
| Index | Message | Index | Message | Index | Message |
| 0 | Rank 2 pattern, DMRS port 0 with SC0 allocated (Synchronous HARQ) | 0 | Rank 2 pattern, DMRS port 0 with SC0 allocated | 0 | Rank 2 pattern, DMRS port 0, 1 with SC0 allocated |
| 1 | Rank 2 pattern, DMRS port 1 with SC0 allocated (Synchronous HARQ) | 1 | Rank 2 pattern, DMRS port 1 with SC0 allocated | 1 | Rank 4 pattern, DMRS port 0, 1, 2 with SC0 allocated |
| 2 | Rank 2 pattern, DMRS port 0 with | 2 | Rank 2 pattern, DMRS port 0 with | 2 | Rank 2 pattern, DMRS port 0, 1 |

TABLE 19-continued

DM-RS antenna port and synchronous HARQ indication method in an SU-MIMO transmission for up to 8 layers per UE and an MU-MIMO transmission for up to 2 layers per UE with a maximum composite rank 4 (maximum 4 co-scheduled UEs)

| One of Transport Block 0 or Transport Block 1 Enabled | | | | Transport Block 0 Enabled Transport Block 1 Enabled | |
|---|---|---|---|---|---|
| NDI x = 0 | | NDI x = 1 | | | |
| Index | Message | Index | Message | Index | Message |
| | SC1 allocated (Synchronous HARQ) | | SC1 allocated | | with SC1 allocated |
| 3 | Rank 2 pattern, DMRS port 1 with SC1 allocated (Synchronous HARQ) | 3 | Rank 2 pattern, DMRS port 1 with SC1 allocated | 3 | Rank 4 pattern, DMRS port 0, 1, 2, 3 with SC0 allocated |
| 4 | Synchronous Transmit Diversity | 4 | Rank 2 pattern, DMRS port 0, 1 with SC0 allocated | 4 | Rank 8 pattern, DMRS port 0, 1, 2, 3, 4 with SC0 allocated |
| 5 | Asynchronous Transmit Diversity | 5 | Rank 2 pattern, DMRS port 0, 1 with SC1 allocated | 5 | Rank 8 pattern, DMRS port 0, 1, 2, 3, 4, 5 with SC0 allocated |
| 6 | Reserved | 6 | Rank 4 pattern, DMRS port 0, 1, 2 with SC0 allocated | 6 | Rank 8 pattern, DMRS port 0, 1, 2, 3, 4, 5, 6 with SC0 allocated |
| 7 | Reserved | 7 | Rank 4 pattern, DMRS port 0, 1, 2, 3 with SC0 allocated | 7 | Rank 8 pattern, DMRS port 0, 1, 2, 3, 4, 5, 6, 7 with SC0 allocated |

Using Table 19, it is possible to notify a UE of an synchronous HARQ transmission and whether transmit diversity is applied or not by using an NDI bit for a transport block that is not transmitted. In Table 19, when the NDI bit for the transport block that is not transmitted is set to 0, the index value can be used to notify the UE of the synchronous SU/MU-MIMO or the transmit diversity. Table 19 is designed such that the synchronous HARQ in SU/MU-MIMO is available for the initial transmission. This is the result of selecting the most significant transmission modes in consideration of the limited number of index.

Figure 12:
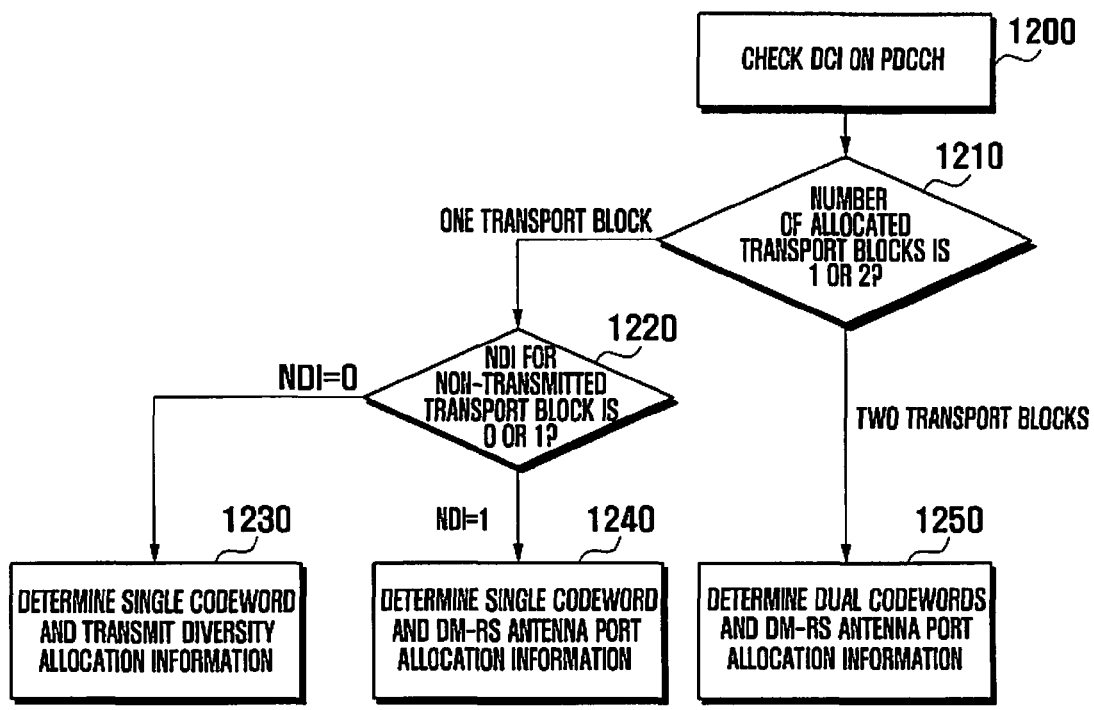
FIG. 12 is a flowchart illustrating a procedure for notifying of whether transmit diversity is applied with a New Data Indicator (NDI) bit for a transport block according to an embodiment of the present invention.

FIG. 12 is a flowchart illustrating a procedure for notifying a UE as to whether transmit diversity is applied by using an NDI bit for a transport block that is not transmitted in Tables 15 and 16, according to an embodiment of the present invention.

Referring to FIG. 12, the UE receives PDCCH and checks the DCI carried on the PDCCH in step 1200. In step 1210, the UE determines whether the number of transport blocks transmitted is 1 or 2. When 2 transport blocks are transmitted, the UE determines the DM-RS antenna port allocated to itself based on the DM-RS antenna port indication information 1150 of the control information on the PDCCH (see FIG. 11) in step 1250. Otherwise, when 1 transport block is transmitted, in step 1220, the UE determines whether the NDI for the transport block that is not transmitted is set to 0 or 1.

If the NDI for the transport block that is not transmitted is set to 0, in step 1230, the UE determines that the transmit diversity is applied. Otherwise, if the NDI for the transport block that is not transmitted in set to 1, the UE determines that the SU-MIMO or MU-MIMO transmission is performed in step 1240. The detailed information notified to the UE in FIG. 12 is determined by referencing Tables 15 and 16.

Figure 13:
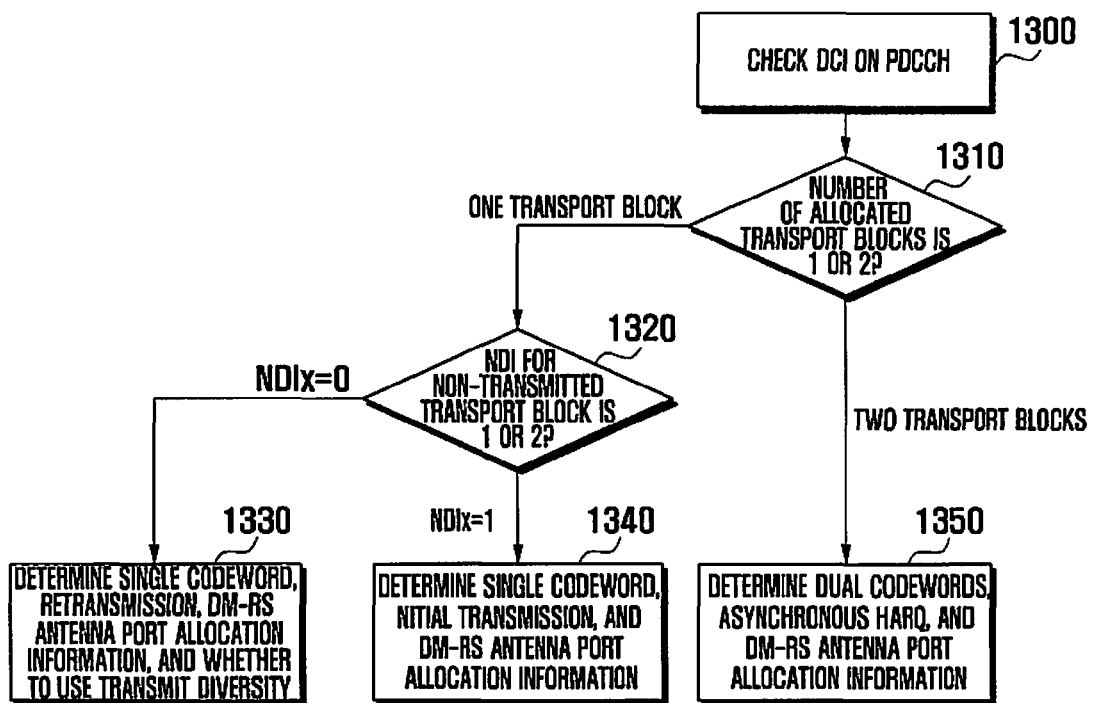
FIG. 13 is a flowchart illustrating a procedure for notifying of whether a current transmission is an initial transmission or a retransmission and whether transmit diversity is applied or not with an NDI bit for a transport block according to an embodiment of the present invention.

FIG. 13 is a flowchart illustrating a procedure for notifying a UE as to whether a current transmission is an initial transmission or a retransmission and whether transmit diversity is applied or not by using an NDI bit for a transport block that is not transmitted in Table 17, according to an embodiment of the present invention.

Referring to FIG. 13, the UE checks the DCI carried on the PDCCH in step 1300. In step 1310, the UE determines whether the number of transport blocks transmitted is 1 or 2. When 2 transport blocks are transmitted, the UE determines the DM-RS antenna port allocated to the UE itself, based on the DM-RS antenna port indication information 1150 of the control information on the PDCCH (see FIG. 11) in step 1350. Otherwise, when 1 transport block is transmitted at step 1310, in step 1320, the UE determines whether the NDI for the transport block, which is not transmitted, is set to 0 or 1.

If the NDI for the transport block that is not transmitted is set to 0, the UE determines that the current transmission is retransmission in step 1330. Otherwise, if the NDI for the transport block that is not transmitted is set to 1, the UE determines that the current transmission is initial transmission in step 1340. Also, if it is determined that one transport block is transmitted and the NDI bit for the transport block which is not transmitted is set to 0, the UE determines whether the transmit diversity is applied based on the DM-RS antenna port indication information 1150. The detailed information notified to the UE in FIG. 13 is determined by referencing Table 17.

Figure 14:
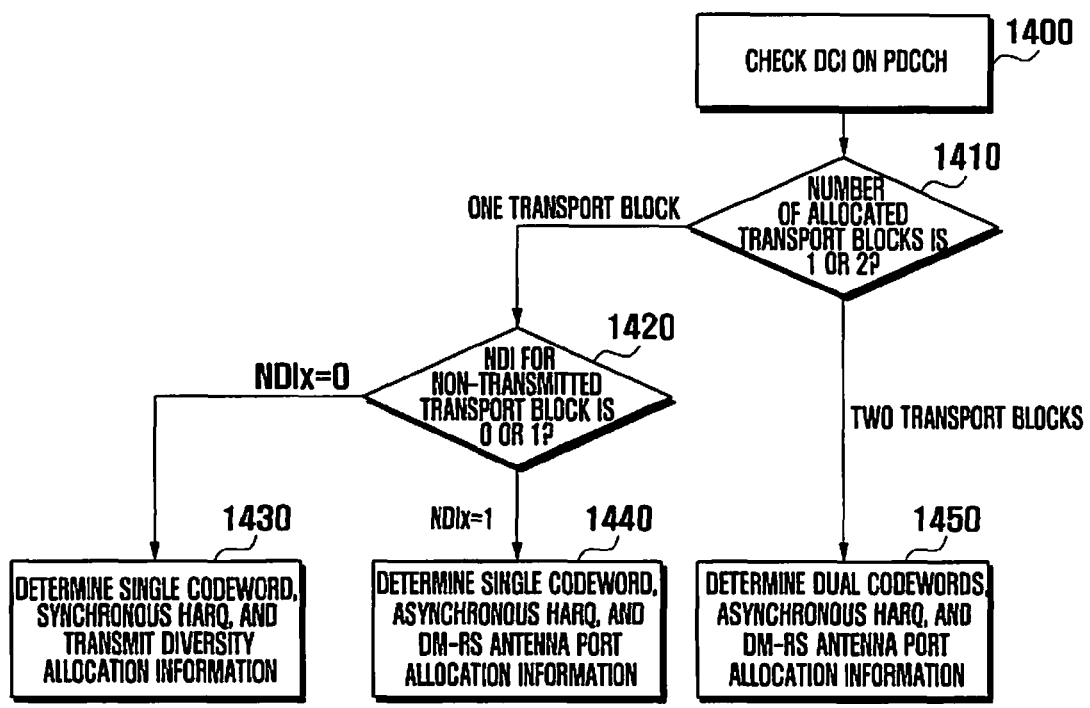
FIG. 14 is a flowchart illustrating a procedure for notifying of whether synchronous HARQ is applied or not with an NDI bit for a transport block according to an embodiment of the present invention.

FIG. 14 is a flowchart illustrating a procedure for notifying a UE as to whether synchronous HARQ is applied by using an NDI bit for a transport block that is not transmitted in Table 18, according to an embodiment of the present invention.

Referring to FIG. 14, the UE checks the DCI carried on a PDCCH in step 1400. In step 1410, the UE determines whether the number of transport blocks transmitted is 1 or 2. When 2 transport blocks are transmitted, the UE determines the DM-RS antenna port allocated to the UE itself, based on the DM-RS antenna port indication information 1150 of the control information on the PDCCH (see FIG. 11) in step 1450. Otherwise, when 1 transport block is transmitted, the UE determines whether the NDI for the transport block that is not transmitted is set to 0 or 1 in step 1420.

If the NDI for the transport block that is not transmitted is set to 0, the UE determines that synchronous HARQ is applied in step 1430. Otherwise, if the NDI for the transport block that is not transmitted is set to 1, the UE determines that the asynchronous HARQ is applied in step 1440. The detailed information notified to the UE in FIG. 14 is determined by referencing Table 18.

The aforementioned synchronous HARQ transmission notification method is directed to the downlink transmission, i.e., from the eNB to the UE. However, the synchronous HARQ transmission notification method can also be applied to the uplink transmission, i.e., from the UE to the eNB.

As described above, the DM-RS antenna port indication method of the present invention is capable of efficiently notifying a UE of the DM-RS resource allocation information for receiving the downlink traffic signal along with the information on the DM-RS resources allocated for other UEs in a same frequency/time resources in an LTE-A system, thereby improving system performance.

Although not illustrated in the drawings, the methods according to the above-described embodiments of the present invention can performed by a UE or an eNB, which includes a radio communication unit, i.e., transmitter and receiver, and a controller.

For example, a UE can include a radio communication unit for receiving the control information including transport block information and DM-RS antenna port allocation indication information and a controller for checking a number of transport blocks allocated to the terminal using the transport block information and interpreting the DM-RS antenna port allocation indication information according to the number of transport blocks.

Additionally, an eNB can include a controller for checking a number of transport blocks allocated to a UE, selecting DM-RS antenna port allocation information according to the number of the transport blocks, generating control information including transport block information and selected DM-RS antenna port allocation indication information, and a radio communication unit for transmitting the generated control information to the UE.

Although certain embodiments of the present invention have been described in detail hereinabove, it should be clearly understood that many variations and/or modifications of the basic inventive concepts herein taught, which may appear to those skilled in the present art will still fall within the spirit and scope of the present invention, as defined in the appended claims and any equivalents thereof.

What is claimed is:

1. A control information interpretation method of a terminal in a mobile communication system, comprising:
    receiving, by the terminal, control information including transport block information and antenna port related information;
    identifying whether a codeword 0 is enabled and a codeword 1 is disabled, or both the codeword 0 and the codeword 1 are enabled based on the transport block information; and
    interpreting the antenna port related information according to a result of the identification.

2. The method of claim 1, wherein, if the codeword 0 is enabled and the codeword 1 is disabled, the antenna port related information is configured to indicate up to 4 antenna ports for 4 layers,
    wherein a reference signal (RS) for one layer includes one of a combination of 0 or 1 and a 1st antenna port or a 2nd antenna port,
    wherein RSs for two layers include the 1st antenna port and the 2nd antenna port,
    wherein RSs for three layers include the 1st antenna port, the 2nd antenna port, and a 3rd antenna port, and
    wherein RSs for four layers include the 1st antenna port, the 2nd antenna port, the 3rd antenna port, and a 4th antenna port.

3. The method of claim 1, wherein, if both the codeword 0 and the codeword 1 are enabled, the antenna port related information is configured to indicate up to 8 antenna ports for 8 layers,
    wherein reference signals (RSs) for two layers include the 1st antenna port and the 2nd antenna port,
    wherein RSs for three layers include the 1st antenna port, the 2nd antenna port, and a 3rd antenna port,
    wherein RSs for four layers include the 1st antenna port, the 2nd antenna port, the 3rd antenna port, and a 4th antenna port,
    wherein RSs for five layers include the 1st antenna port, the 2nd antenna port, the 3rd antenna port, the 4th antenna port, and a 5th antenna port,
    wherein RSs for six layers include the 1st antenna port, the 2nd antenna port, the 3rd antenna port, the 4th antenna port, the 5th antenna port, and a 6th antenna port,
    wherein RSs for seven layers include the 1st antenna port, the 2nd antenna port, the 3rd antenna port, the 4th antenna port, the 5th antenna port, the 6th antenna port, and a 7th antenna port, and
    wherein RSs for eight layers include the 1st antenna port, the 2nd antenna port, the 3rd antenna port, the 4th antenna port, the 5th antenna port, the 6th antenna port, the 7th antenna port, and an 8th antenna port.

4. The method of claim 1, wherein the antenna port related information includes a maximum rank set to 4, and when the codeword 0 is enabled and the codeword 1 is disabled, a scrambling sequence of 0 or 1 for a rank 1 or 2, and a scrambling sequence 0 for a rank 3.

5. The method of claim 1, wherein the antenna port related information includes a maximum rank set to 8, and when both the codeword 0 and the codeword 1 are enabled, a scrambling sequence of 0 or 1 for a rank 2 and a scrambling sequence 0 for a rank 3.

6. The method of claim 1, wherein interpreting the antenna port related information according to the result of the identification comprises:
    interpreting the antenna port related information for a rank 1, when the codeword 0 is enabled and the codeword 1 is disabled and a current transmission is an initial transmission;
    interpreting the antenna port related information for all ranks, when the codeword 0 is enabled and the codeword 1 is disabled and a current transmission is a retransmission; and
    interpreting the antenna port related information for all the ranks at the initial transmission and the retransmission, when both the codeword 0 and the codeword 1 are enabled.

7. The method of claim 1, wherein the control information includes indication information for notifying the terminal as to whether a number of other terminals allocated at least one layer transmitted by a base station is greater than or equal to 1.

8. The method of claim 1, wherein the antenna port related information includes at least one of an index indicating a DeModulation Reference Signal (DM-RS) antenna port 0 allocated a scrambling code 0 in rank pattern 2, an index indicating a DM-RS antenna port 1 allocated scrambling code 0 in rank pattern 2, an index indicating the DM-RS antenna port 0 allocated scrambling code 1 in rank pattern 2, an index indicating the DM-RS antenna port 1 allocated scrambling code 1 in rank pattern 2, an index indicating the DM-RS antenna ports 0 and 1 allocated scrambling code 0 in rank pattern 2, an index indicating the DM-RS antenna ports 0, 1, and 2 allocated scrambling code 0 in rank pattern 4, and a index indicating the DM-RS antenna ports 0, 1, 2, and 3 allocated scrambling code 0 in rank pattern 4, when the codeword 0 is enabled and the codeword 1 is disabled, and
- at least one of an index indicating the DM-RS antenna ports 0 and 1 allocated scrambling code 0 in rank pattern 2, an index indicating the DM-RS antenna ports 0, 1 and 2 allocated scrambling code 0 in rank pattern 4, an index indicating the DM-RS antenna ports 0 and 1 allocated scrambling code 1 in rank pattern 2, an index indicating the DM-RS antenna ports 0, 1, 2, and 3 allocated scrambling code 0 in rank pattern 4, an index indicating the DM-RS antenna ports 0, 1, 2, 3, and 4 allocated scrambling code 0 in rank pattern 8, an index indicating the DM-RS antenna ports 0, 1, 2, 3, 4, and 5 allocated scrambling code 0 in rank pattern 8, an index indicating the DM-RS antenna ports 0, 1, 2, 3, 4, 5, and 6 allocated scrambling code 0 in rank pattern 8, and an index indicating the DM-RS antenna ports 0, 1, 2, 3, 4, 5, 6, and 7 allocated scrambling code 0 in rank pattern 8, when both the codeword 0 and the codeword 1 are enabled,
- wherein the DM-RS antenna port 0 is a first antenna port allocated a DM-RS among all Reference Signals (RSs), and an arbitrary DM-RS antenna port n is indexed in ascending order from the DM-RS antenna port 0.

9. A control information transmission method of a base station in a mobile communication system, comprising:
- determining, by the base station, whether a codeword 0 is enabled and a codeword 1 is disabled, or both the codeword 0 and the codeword 1 are enabled;
- selecting antenna port related information according to a result of the determination;
- generating control information including transport block information indicating whether the codeword 0 is enabled and the codeword 1 is disabled, or both the codeword 0 and the codeword 1 are enabled and the antenna port related information; and
- transmitting the control information to the terminal.

10. The method of claim 9, wherein, if the codeword 0 is enabled and the codeword 1 is disabled, the antenna port related information is configured to indicate up to 4 antenna ports for 4 layers,
- wherein a reference signal (RS) for one layer includes one of a combination of 0 or 1 and a 1st antenna port or a 2nd antenna port,
- wherein RSs for two layers include the 1st antenna port and the 2nd antenna port,
- wherein RSs for three layers include the 1st antenna port, the 2nd antenna port, and a 3rd antenna port, and
- wherein RSs for four layers include the 1st antenna port, the 2nd antenna port, the 3rd antenna port, and a 4th antenna port.

11. The method of claim 9, wherein, if both the codeword 0 and the codeword 1 are enabled, the antenna port related information is configured to indicate up to 8 antenna ports for 8 layers,
- wherein reference signals (RSs) for two layers include the 1st antenna port and the 2nd antenna port,
- wherein RSs for three layers include the 1st antenna port, the 2nd antenna port, and a 3rd antenna port,
- wherein RSs for four layers include the 1st antenna port, the 2nd antenna port, the 3rd antenna port, and a 4th antenna port,
- wherein RSs for five layers include the 1st antenna port, the 2nd antenna port, the 3rd antenna port, the 4th antenna port, and a 5th antenna port,
- wherein RSs for six layers include the 1st antenna port, the 2nd antenna port, the 3rd antenna port, the 4th antenna port, the 5th antenna port, and a 6th antenna port,
- wherein RSs for seven layers include the 1st antenna port, the 2nd antenna port, the 3rd antenna port, the 4th antenna port, the 5th antenna port, the 6th antenna port, and a 7th antenna port, and
- wherein RSs for eight layers include the 1st antenna port, the 2nd antenna port, the 3rd antenna port, the 4th antenna port, the 5th antenna port, the 6th antenna port, the 7th antenna port, and an 8th antenna port.

12. The method of claim 9, wherein the antenna port related indication information includes a maximum rank set to 4, and when the codeword 0 is enabled and the codeword 1 is disabled, a scrambling sequence of 0 or 1 for a rank 1 or 2, and a scrambling sequence 0 for a rank 3.

13. The method of claim 9, wherein the antenna port related information includes a maximum rank set to 8, and when both the codeword 0 and the codeword 1 are enabled, a scrambling sequence of 0 or 1 for a rank 2, and a scrambling sequence 0 for a rank 3.

14. The method of claim 9, wherein selecting the antenna port related information comprises:
- selecting the antenna port related information in a rank 1, when the codeword 0 is enabled and the codeword 1 is disabled and a current transmission is an initial transmission;
- selecting the antenna port related information in all ranks, when the codeword 0 is enabled and the codeword 1 is disabled and the current transmission is a retransmission; and
- selecting the antenna port related information in all the ranks for the initial transmission and the retransmission, when both the codeword 0 and the codeword 1 are enabled.

15. The method of claim 9, wherein the control information includes indication information for notifying the terminal as to whether a number of other terminals allocated at least one layer transmitted by a base station is greater than or equal to 1.

16. The method of claim 9, wherein the antenna port related information includes at least one of an index indicating a DeModulation Reference Signal (DM-RS) antenna port 0 allocated a scrambling code 0 in rank pattern 2, an index indicating a DM-RS antenna port 1 allocated scrambling code 0 in rank pattern 2, an index indicating the DM-RS antenna port 0 allocated scrambling code 1 in rank pattern 2, an index indicating the DM-RS antenna port 1 allocated scrambling code 1 in rank pattern 2, an index indicating the DM-RS antenna ports 0 and 1 allocated scrambling code 0 in rank pattern 2, an index indicating the DM-RS antenna ports 0, 1, and 2 allocated scrambling code 0 in rank pattern 4, and a index indicating the DM-RS antenna ports 0, 1, 2, and 3 allocated scrambling code 0 in rank pattern 4, when the codeword 0 is enabled and the codeword 1 is disabled, and at least one of an index indicating the DM-RS antenna ports 0 and 1 allocated scrambling code 0 in rank pattern 2, an index indicating the DM-RS antenna ports 0, 12 allocated scrambling code 0 in rank pattern 4, an index indicating the DM-RS antenna ports 0 and 1 allocated scrambling code 1 in rank pattern 2, an index indicating the DM-RS antenna ports 0, 1, 2, and 3 allocated scrambling code 0 in rank pattern 4, an index indicating the DM-RS antenna ports 0, 1, 2, 3, and 4 allocated scrambling code 0 in rank pattern 8, an index indicating the DM-RS antenna ports 0, 1, 2, 3, 4, and 5 allocated scrambling code 0 in rank pattern 8, an index indicating the DM-RS antenna ports 0, 1, 2, 3, 4, 5, and 6 allocated scrambling code 0 in rank pattern 8, and an index indicating the DM-RS antenna ports 0, 1, 2, 3, 4, 5, 6, and 7 allocated scrambling code 0 in rank pattern 8, when both the codeword 0 and the codeword 1 are enabled, wherein the DM-RS antenna port 0 is a first antenna port allocated a DM-RS among all Reference Signals (RSs), and an arbitrary DM-RS antenna port n is indexed in ascending order from the DM-RS antenna port 0.

17. A terminal for interpreting control information received from a base station in a mobile communication system, comprising:

a transceiver configured to receive control information including transport block information and antenna port related information; and a controller configured to identify whether a codeword 0 is enabled and a codeword 1 is disabled, or both codeword 0 and codeword 1 are enabled based on the transport block information, for interpreting the antenna port related information according to a result of the identification.

18. The terminal of claim 17, wherein, if the codeword 0 is enabled and the codeword 1 is disabled, the antenna port related information is configured to indicate up to 4 antenna ports for 4 layers, wherein a reference signal (RS) for one layer includes one of a combination of 0 or 1 and a 1st antenna port or a 2nd antenna port, wherein RSs for two layers include the 1st antenna port and the 2nd antenna port, wherein RSs for three layers include the 1st antenna port, the 2nd antenna port, and a 3rd antenna port, and wherein RSs for four layers include the 1st antenna port, the 2nd antenna port, the 3rd antenna port, and a 4th antenna port.

19. The terminal of claim 17, wherein, if both the codeword 0 and the codeword 1 are enabled, the antenna port related information is configured to indicate up to 8 antenna ports for 8 layers, wherein reference signals (RSs) for two layers include the 1st antenna port and the 2nd antenna port, wherein RSs for three layers include the 1st antenna port, the 2nd antenna port, and a 3rd antenna port, wherein RSs for four layers include the 1st antenna port, the 2nd antenna port, the 3rd antenna port, and a 4th antenna port, wherein RSs for five layers include the 1st antenna port, the 2nd antenna port, the 3rd antenna port, the 4th antenna port, and a 5th antenna port, wherein RSs for six layers include the 1st antenna port, the 2nd antenna port, the 3rd antenna port, the 4th antenna port, the 5th antenna port, and a 6th antenna port, wherein RSs for seven layers include the 1st antenna port, the 2nd antenna port, the 3rd antenna port, the 4th antenna port, the 5th antenna port, the 6th antenna port, and a 7th antenna port, and wherein RSs for eight layers include the 1st antenna port, the 2nd antenna port, the 3rd antenna port, the 4th antenna port, the 5th antenna port, the 6th antenna port, the 7th antenna port, and an 8th antenna port.

20. The terminal of claim 17, wherein the antenna port related information comprises a maximum rank set to 4, and when the codeword 0 is enabled and the codeword 1 is disabled, a scrambling sequence of 0 or 1 for a rank 1 or 2, and a scrambling sequence 0 for a rank 3.

21. The terminal of claim 17, wherein the antenna port related information comprises a maximum rank set to 8, and when both the codeword 0 and the codeword 1 are enabled, a scrambling sequence of 0 or 1 for a rank 2, and a scrambling sequence 0 for a rank 3.

22. The terminal of claim 17, wherein the controller is configured to interpret the antenna port related information for a rank 1, when the codeword 0 is enabled and the codeword 1 is disabled and a current transmission is an initial transmission, interpret the antenna port related information for all ranks, when the codeword 0 is enabled and the codeword 1 is disabled and the current transmission is a retransmission, and interprets the antenna port related information for all the ranks at the initial transmission and the retransmission, when both the codeword 0 and the codeword 1 are enabled.

23. The terminal of claim 17, wherein the control information comprises indication information for notifying the terminal as to whether a number of other terminals allocated at least one layer transmitted by the base station is greater than or equal to 1.

24. The terminal of claim 17, wherein the antenna port related information comprises:

at least one of an index indicating a DeModulation Reference Signal (DM-RS) antenna port 0 allocated a scrambling code 0 in rank pattern 2, an index indicating a DM-RS antenna port 1 allocated scrambling code 0 in rank pattern 2, an index indicating the DM-RS antenna port 0 allocated scrambling code 1 in rank pattern 2, an index indicating the DM-RS antenna port 1 allocated scrambling code 1 in rank pattern 2, an index indicating the DM-RS antenna ports 0 and 1 allocated scrambling code 0 in rank pattern 2, an index indicating the DM-RS antenna ports 0, 1, and 2 allocated scrambling code 0 in rank pattern 4, and a index indicating the DM-RS antenna ports 0, 1, 2, and 3 allocated scrambling code 0 in rank pattern 4, when the codeword 0 is enabled and the codeword 1 is disabled; and at least one of an index indicating the DM-RS antenna ports 0 and 1 allocated scrambling code 0 in rank pattern 2, an index indicating the DM-RS antenna ports 0, 1 and 2 allocated scrambling code 0 in rank pattern 4, an index indicating the DM-RS antenna ports 0 and 1 allocated scrambling code 1 in rank pattern 2, an index indicating the DM-RS antenna ports 0, 1, 2, and 3 allocated scrambling code 0 in rank pattern 4, an index indicating the DM-RS antenna ports 0, 1, 2, 3, and 4 allocated scrambling code 0 in rank pattern 8, an index indicating the DM-RS antenna ports 0, 1, 2, 3, 4, and 5 allocated scrambling code 0 in rank pattern 8, an index indicating the DM-RS antenna ports 0, 1, 2, 3, 4, 5, and 6 allocated scrambling code 0 in rank pattern 8, and an index indicating the DM-RS antenna ports 0, 1, 2, 3, 4, 5, 6, and 7 allocated scrambling code 0 in rank pattern 8, when both the codeword 0 and the codeword 1 are enabled, wherein the DM-RS antenna port 0 is a first antenna port allocated a DM-RS among all Reference Signals (RSs), and an arbitrary DM-RS antenna port n is indexed in ascending order from the DM-RS antenna port 0.

25. A base station for transmitting control information in a mobile communication system, comprising:
a controller configured to determine whether a codeword 0 is enabled and a codeword 1 is disabled, or both the codeword 0 and the codeword 1 are enabled, select antenna port related information according to a result of the determination, and generate control information including transport block information indicating whether the codeword 0 is enabled and the codeword 1 is disabled, or both the codeword 0 and the codeword 1 are enabled and the antenna port related information, and
a transceiver configured to transmit the control information to the terminal.

26. The base station of claim 25, wherein, if the codeword 0 is enabled and the codeword 1 is disabled, the antenna port related information is configured to indicate up to 4 antenna ports for 4 layers,
wherein a Reference Signal (RS) for one layer includes one of a combination of 0 or 1 and a 1st antenna port or a 2nd antenna port,
wherein RSs for two layers include the 1st antenna port and the 2nd antenna port,
wherein RSs for three layers include the 1st antenna port, the 2nd antenna port, and a 3rd antenna port, and
wherein RSs for four layers include the 1st antenna port, the 2nd antenna port, the 3rd antenna port, and a 4th antenna port.

27. The base station of claim 25, wherein, if both the codeword 0 and the codeword 1 are enabled, the antenna port related information is configured to indicate up to 8 antenna ports for 8 layers,
wherein reference signals (RSs) for two layers include the 1st antenna port and the 2nd antenna port,
wherein RSs for three layers include the 1st antenna port, the 2nd antenna port, and a 3rd antenna port,
wherein RSs for four layers include the 1st antenna port, the 2nd antenna port, the 3rd antenna port, and a 4th antenna port,
wherein RSs for five layers include the 1st antenna port, the 2nd antenna port, the 3rd antenna port, the 4th antenna port, and a 5th antenna port,
wherein RSs for six layers include the 1st antenna port, the 2nd antenna port, the 3rd antenna port, the 4th antenna port, the 5th antenna port, and a 6th antenna port,
wherein RSs for seven layers include the 1st antenna port, the 2nd antenna port, the 3rd antenna port, the 4th antenna port, the 5th antenna port, the 6th antenna port, and a 7th antenna port, and
wherein RSs for eight layers include the 1st antenna port, the 2nd antenna port, the 3rd antenna port, the 4th antenna port, the 5th antenna port, the 6th antenna port, the 7th antenna port, and an 8th antenna port.

28. The base station of claim 25, wherein the antenna port related information comprises a maximum rank set to 4, and when the codeword 0 is enabled and the codeword 1 is disabled, a scrambling sequence of 0 or 1 for a rank 1 or 2, and a scrambling sequence 0 for a rank 3.

29. The base station of claim 25, wherein the antenna port related information comprises a maximum rank set to 8, and when both the codeword 0 and the codeword 1 are enabled, a scrambling sequence of 0 or 1 for a rank 2, and a scrambling sequence 0 for a rank 3.

30. The base station of claim 25, wherein the controller is configured to select the antenna port related information in a rank 1, when the codeword 0 is enabled and the codeword 1 is disabled and a current transmission is an initial transmission, select the antenna port related information in all ranks, when the codeword 0 is enabled and the codeword 1 is disabled and the current transmission is a retransmission, and select the antenna port related information in all the ranks for the initial transmission and the retransmission, when both the codeword 0 and the codeword 1 are enabled.

31. The base station of claim 25, wherein the control information comprises indication information for notifying the terminal as to whether a number of other terminals allocated at least one layer transmitted by the base station is greater than or equal to 1.

32. The base station of claim 25, wherein the antenna port related information comprises:
at least one of an index indicating a DeModulation Reference Signal (DM-RS) antenna port 0 allocated a scrambling code 0 in rank pattern 2, an index indicating a DM-RS antenna port 1 allocated scrambling code 0 in rank pattern 2, an index indicating the DM-RS antenna port 0 allocated scrambling code 1 in rank pattern 2, an index indicating the DM-RS antenna port 1 allocated scrambling code 1 in rank pattern 2, an index indicating the DM-RS antenna ports 0 and 1 allocated scrambling code 0 in rank pattern 2, an index indicating the DM-RS antenna ports 0, 1, and 2 allocated scrambling code 0 in rank pattern 4, and a index indicating the DM-RS antenna ports 0, 1, 2, and 3 allocated scrambling code 0 in rank pattern 4, when the codeword 0 is enabled and the codeword 1 is disabled; and
at least one of an index indicating the DM-RS antenna ports 0 and 1 allocated scrambling code 0 in rank pattern 2, an index indicating the DM-RS antenna ports 0, 1 and 2 allocated scrambling code 0 in rank pattern 4, an index indicating the DM-RS antenna ports 0 and 1 allocated scrambling code 1 in rank pattern 2, an index indicating the DM-RS antenna ports 0, 1, 2, and 3 allocated scrambling code 0 in rank pattern 4, an index indicating the DM-RS antenna ports 0, 1, 2, 3, and 4 allocated scrambling code 0 in rank pattern 8, an index indicating the DM-RS antenna ports 0, 1, 2, 3, 4, and 5 allocated scrambling code 0 in rank pattern 8, an index indicating the DM-RS antenna ports 0, 1, 2, 3, 4, 5, and 6 allocated scrambling code 0 in rank pattern 8, and an index indicating the DM-RS antenna ports 0, 1, 2, 3, 4, 5, 6, and 7 allocated scrambling code 0 in rank pattern 8, when both the codeword 0 and the codeword 1 are enabled,
wherein the DM-RS antenna port 0 is a first antenna port allocated a DM-RS among all Reference Signals (RSs), and an arbitrary DM-RS antenna port n is indexed in ascending order from the DM-RS antenna port 0.

* * * * *